United States Patent
Kim et al.

(10) Patent No.: US 12,267,604 B2
(45) Date of Patent: Apr. 1, 2025

(54) IMAGE ACQUISITION APPARATUS INCLUDING A PLURALITY OF IMAGE SENSORS, AND ELECTRONIC APPARATUS INCLUDING THE IMAGE ACQUISITION APPARATUS

(71) Applicant: SAMSUNG ELECTRONICS CO., LTD., Suwon-si (KR)

(72) Inventors: Woo-Shik Kim, Seongnam-si (KR); Younggeun Roh, Seoul (KR); Inhwan Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 17/831,956

(22) Filed: Jun. 3, 2022

(65) Prior Publication Data
US 2023/0066267 A1    Mar. 2, 2023

(30) Foreign Application Priority Data

Aug. 27, 2021    (KR) .................. 10-2021-0113981

(51) Int. Cl.
*H04N 25/13*    (2023.01)
*H04N 9/73*    (2023.01)
(Continued)

(52) U.S. Cl.
CPC ............... *H04N 25/13* (2023.01); *H04N 9/73* (2013.01); *H04N 23/45* (2023.01); *H04N 23/88* (2023.01)

(58) Field of Classification Search
CPC .......... H04N 25/13; H04N 9/73; H04N 23/45; H04N 23/88; H04N 23/85; H04N 23/13;
(Continued)

(56) References Cited

U.S. PATENT DOCUMENTS 7,701,489 B1    4/2010  Christie et al.
2004/0246350 A1*  12/2004  Sakamoto ................ G06T 5/92
                                                             348/241
(Continued)

FOREIGN PATENT DOCUMENTS

CN    102469243 A    5/2012
CN    110533620 A    12/2019
(Continued)

OTHER PUBLICATIONS

Office Action dated Nov. 28, 2023, issued by Japanese Patent Office in Japanese Patent Application No. 2022-129504.
(Continued)

*Primary Examiner* — Abdelaaziz Tissire
(74) *Attorney, Agent, or Firm* — Sughrue Mion, PLLC

(57) ABSTRACT

An image acquisition apparatus includes: a first image sensor configured to acquire a first image based on a first wavelength band; a second image sensor configured to acquire a second image based on a second wavelength band of 10 nm to 1,000 nm, and a processor configured to register the first image and the second image, which are respectively output from the first image sensor and the second image sensor, to obtain a registration image based on the first image and the second image, and perform color conversion on the registration image by using an illumination value estimated from the second image.

21 Claims, 23 Drawing Sheets

(51) Int. Cl.
*H04N 23/45* (2023.01)
*H04N 23/88* (2023.01)

(58) Field of Classification Search
CPC ........ H04N 23/11; H04N 23/15; H04N 23/74; H04N 5/265; H04N 9/67; H04N 23/56; H04N 23/71; H04N 25/11; H04N 25/745; H04N 23/10; H04N 23/843; H04N 2209/047; H04N 23/67; G06N 3/08; G06T 5/50; G06T 2207/20221; G06T 2207/10024; G06T 7/30; G06T 2207/10048; G06T 3/14; G06T 2207/20021; G06T 7/33; G06T 7/38; G06T 3/4038; G06T 7/136

See application file for complete search history.

(56) References Cited

U.S. PATENT DOCUMENTS

| | | | |
|---|---|---|---|
| 2009/0002475 A1* | 1/2009 | Jelley | H04N 25/581 |
| | | | 348/E7.078 |
| 2009/0256927 A1* | 10/2009 | Komiya | H04N 25/134 |
| | | | 348/E5.025 |
| 2014/0078247 A1* | 3/2014 | Shohara | H04N 23/88 |
| | | | 348/38 |
| 2014/0293089 A1* | 10/2014 | Kitagawa | H04N 23/88 |
| | | | 348/224.1 |
| 2015/0070528 A1* | 3/2015 | Kikuchi | H04N 23/80 |
| | | | 348/224.1 |
| 2017/0054966 A1* | 2/2017 | Zhou | H04N 13/106 |
| 2017/0180656 A1* | 6/2017 | Lee | H04N 23/81 |
| 2019/0045163 A1* | 2/2019 | Nikkanen | H04N 23/88 |
| 2019/0378257 A1 | 12/2019 | Fan et al. | |
| 2020/0389604 A1 | 12/2020 | Venkataraman et al. | |
| 2021/0067712 A1 | 3/2021 | Harter et al. | |
| 2022/0385864 A1* | 12/2022 | Kim | H04N 25/611 |
| 2023/0099629 A1* | 3/2023 | Kim | H04N 25/136 |
| | | | 348/223.1 |
| 2023/0217088 A1* | 7/2023 | Kim | H04N 23/843 |
| | | | 348/231.6 |

FOREIGN PATENT DOCUMENTS

| | | | |
|---|---|---|---|
| JP | 2004-200885 A | | 7/2004 |
| JP | 2011-211317 A | | 10/2011 |
| JP | 2013024653 A | * | 2/2013 |
| JP | 2018-207497 A | | 12/2018 |
| WO | 2018/145576 A1 | | 8/2018 |
| WO | 2021/037934 A1 | | 3/2021 |

OTHER PUBLICATIONS

Laurence T Maloney et al., "Color constancy: a method for recovering surface spectral reflectance", Journal of the Optical Society of America A, vol. 3, Issue No. 1, Jan. 1986, pp. 29-33.

Kobus Barnard et al., "A Comparison of Computational Color Constancy Algorithms—Part I: Methodology and Experiments With Synthesized Data", IEEE Transactions on Image Processing, vol. 11, Issue No. 9, Sep. 2002, pp. 972-983.

Yinqiang Zheng et al., "Illumination and Reflectance Spectra Separation of a Hyperspectral Image Meets Low-Rank Matrix Factorization" IEEE Conference on Computer Vision and Pattern Recognition (CVPR), Oct. 2015, pp. 1779-1787.

Ji-Won Lee et al., "Estimation of Illumination Spectrum from a Hyperspectral Image", IEIE Transactions on Smart Processing and Computing, vol. 8, Issue No. 2, Apr. 2019, pp. 95-99.

ISO and CIE, "Colorimetry—Part 6: CIEDE2000 Colour-difference formula," ISO/CIE 11664-6:2014(E), First Edition, Feb. 1, 2014, 18 Pages.

David J Brady et al., "Smart Cameras", Image and Video Processing (eess.IV), arXiv:2002.04705v1, Feb. 11, 2020, 55 Pages, XP081597787.

Extended European Search Report issued by the European Patent Office on Jan. 24, 2023 for European Patent Application No. 22192380.8.

Communication issued Aug. 23, 2024 by the China National Intellectual Property Administration in Chinese Patent Application No. 202210633355.9.

European Extended Search Report issued Feb. 12, 2025 by the European Patent Office for EP Patent Application No. 22192380.8.

Office Action issued on Jan. 24, 2025 by the Chinese Patent Office in corresponding CN Patent Application No. 202210633355.9.

* cited by examiner

FIG. 12

| F1 (UV1) | F6 (B1) | F11 (B4) | F16 (G4) | F21 (G6) |
| --- | --- | --- | --- | --- |
| F2 (UV2) | F7 (B2) | F12 (B5) | F17 (G5) | F22 (G7) |
| F3 (UV3) | F8 (B3) | F13 (R2) | F18 (R5) | F23 (NIR2) |
| F4 (G1) | F9 (G3) | F14 (R3) | F19 (R6) | F24 (NIR3) |
| F5 (G2) | F10 (R1) | F15 (R4) | F20 (NIR1) | F25 (NIR4) |

[Security]  5700

IMAGE ACQUISITION APPARATUS INCLUDING A PLURALITY OF IMAGE SENSORS, AND ELECTRONIC APPARATUS INCLUDING THE IMAGE ACQUISITION APPARATUS

CROSS-REFERENCE TO RELATED APPLICATION

This application is based on and claims priority under 35 U.S.C. § 119 to Korean Patent Application No. 10-2021-0113981, filed on Aug. 27, 2021, in the Korean Intellectual Property Office, the disclosure of which is incorporated by reference herein in its entirety.

BACKGROUND

1. Field

The disclosure relates to image acquisition apparatuses including a plurality of image sensors, and electronic apparatuses including the image acquisition apparatuses.

2. Description of Related Art

Image sensors receive light incident from an object and photoelectrically convert the received light into an electrical signal.

Such an image sensor uses a color filter including an array of filter elements capable of selectively transmitting red light, green light, and blue light for color expression, senses the amount of light that has passed through each filter element, and then forms a color image of the object through image processing.

Because the values sensed by the image sensors are affected by illumination, the colors of images captured by cameras are also affected by illumination. A technique for eliminating such effects and photographing the unique colors of objects as much as possible is called "white balance."

In the related art, an RGB image is first captured, and then white balancing is performed by analyzing information contained in the RGB image. However, because this method is based on the Gray World Assumption, that is, the assumption that the averages of R, G, and B channel values are equal to each other, or has other limiting conditions, the method may not work properly when the assumption or the limiting conditions are not satisfied.

SUMMARY

Provided are image acquisition apparatuses including a plurality of image sensors, and electronic apparatuses including the image acquisition apparatuses.

Additional aspects will be set forth in part in the description which follows and, in part, will be apparent from the description, or may be learned by practice of embodiments of the disclosure.

In accordance with an aspect of the disclosure, an image acquisition apparatus includes a first image sensor configured to acquire a first image based on a first wavelength band; a second image sensor configured to acquire a second image based on a second wavelength band of 10 nm to 1,000 nm, and a processor configured to register the first image and the second image, which are respectively output from the first image sensor and the second image sensor; obtain a registration image based on the first image and the second image; and perform color conversion on the registration image by using an illumination value estimated from the second image.

The processor may be further configured to divide the first image into one or more first regions and divide the second image into one or more second regions respectively corresponding to the one or more first regions; estimate a respective illumination value for each of the one or more second regions; and perform the color conversion on each of the one or more first regions by using the estimated illumination values.

The processor may be further configured to, when a difference between illumination values respectively estimated for adjacent second regions of the one or more second regions is greater than or equal to a first threshold value, adjust any one of the illumination values of the adjacent second regions to adjust the difference to be less than the first threshold value.

The processor may be further configured to, after performing the color conversion, perform post-processing on a boundary portion between the adjacent second regions.

The processor may be further configured to calculate a parameter for registering the first image and the second image based on at least one of a resolution, a field of view, and a focal length of each of the first image sensor and the second image sensor.

The processor may be further configured to estimate the illumination value by using spectral information obtained from a plurality of channels output from the second image sensor.

The processor may be further configured to estimate the illumination value by using a neural network trained on a plurality of second images associated with predetermined illumination values.

The processor may be further configured to register the first image and the second image by respectively extracting first features from the first image and second features from the second image and matching the first extracted features with the second extracted features.

The processor may be further configured to register the first image and the second image in units of pixel groups, pixels, or sub-pixels of the first image and the second image.

The first image sensor may include a first pixel array including a first sensor layer in which a plurality of first sensing elements are arrayed; and a color filter on the first sensor layer and including red, green, and blue filters which are alternately arranged, and the second image sensor may include a second pixel array including a second sensor layer in which a plurality of second sensing elements are arrayed; and a spectral filter on the second sensor layer and in which a filter group is repeatedly arranged, the filter group including a plurality of unit filters each having a different transmission wavelength band from each other unit filter in the filter group.

A combined transmission wavelength band of the plurality of unit filters of the filter group may include a visible light wavelength band and may be wider than the visible light wavelength band, and the plurality of unit filters may include 16 unit filters arranged in a 4×4 array.

The first pixel array and the second pixel array may be horizontally apart from each other on a circuit board.

First circuit elements configured to process a signal from the first sensor layer, and second circuit elements configured to process a signal from the second sensor layer may be provided on the circuit board.

The image acquisition apparatus may further include a timing controller configured to synchronize operations of the first circuit elements with operations of the second circuit elements.

The image acquisition apparatus may further include a first memory storing data about the first image; and a second memory storing data about the second image.

The first memory and the second memory may be provided inside the circuit board.

The image acquisition apparatus may further include a first imaging optical system configured to form a first optical image of an object on the first image sensor, the first imaging optical system including at least one first lens; and a second imaging optical system configured to form a second optical image of the object on the second image sensor, the second imaging optical system including at least one second lens.

The first imaging optical system and the second imaging optical system may have an identical focal length and an identical field of view.

An electronic apparatus may include the image acquisition apparatus of an above-noted aspect of the disclosure.

In accordance with an aspect of the disclosure, a method of controlling an image acquisition apparatus including a plurality of image sensors includes acquiring a first image and a second image from a first image sensor and a second image sensor, respectively; registering the acquired first and second images to obtain a registration image; and performing color conversion on the registration image by using an illumination value estimated from the second image.

In accordance with an aspect of the disclosure, an image acquisition apparatus includes a first image sensor including a first filter; a second image sensor including a second filter different from the first filter; and a processor configured to receive a first image of an object from the first image sensor and a second image of the object from the second image sensor; and based on the received first image and the received second image, generate a white balanced first image of the object by eliminating an influence of illumination reflected by the object.

The first image sensor may include a plurality of first pixels, the first filter may include a plurality of first filter groups repeatedly arranged, each first filter group including a plurality of first unit filters each corresponding to a respective first pixel, the second image sensor may include a plurality of second pixels, the second filter may include a plurality of second filter groups repeatedly arranged, each second filter group including a plurality of second unit filters each corresponding to a respective second pixel, each first filter group of the first filter may correspond to a respective second filter group of the second filter, and a wavelength band of each first unit filter may be larger than a wavelength band of each second unit filter.

A combined wavelength band of the first filter group may be smaller than a combined wavelength band of the second filter group.

The processor may be further configured to generate a conversion matrix based on the second image for eliminating the influence of illumination reflected by the object; and generate the white balanced first image based on the conversion matrix and the first image.

The processor may be further configured to divide the first image into portions corresponding to the plurality of first filter groups and divide the second image into portions corresponding to the plurality of second filter groups; generate a respective conversion matrix for each portion of the second image; and generate portions of the white balanced first image based on respective conversion matrixes and respective portions of the first image.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 10 to 12 are views illustrating examples of pixel arrangements of the second image sensor provided in the image acquisition apparatus according to embodiments;

DETAILED DESCRIPTION

Figure 1:
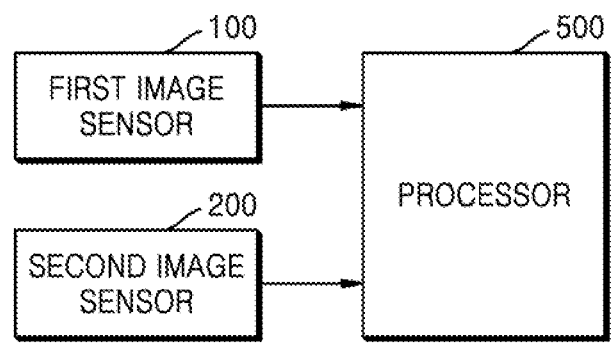
FIG. 1 is a block diagram illustrating a schematic structure of an image acquisition apparatus according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described with reference to the accompanying drawings. The embodiments described below are only examples, and thus, it should be understood that embodiments may be modified in various forms. In the drawings, like reference numerals refer to like elements throughout, and the sizes of elements may be exaggerated for clarity.

In the following description, when an element is referred to as being "above" or "on" another element, it may be directly on the other element while making contact with the other element or may be above the other element without making contact with the other element.

Although terms such as "first" and "second" are used to describe various elements, these terms are only used to distinguish one element from another element. These terms do not limit elements to having different materials or structures.

As used herein, the singular forms "a," "an," and "the" are intended to include the plural forms as well, unless the context clearly indicates otherwise. In addition, it will be understood that when a unit is referred to as "comprising" another element, it does not preclude the possibility that one or more other elements may exist or may be added.

In the disclosure, terms such as "unit" or "module" may be used to denote a unit that has at least one function or operation and is implemented with hardware, software, or a combination of hardware and software.

An element referred to with the definite article or a demonstrative pronoun may be construed as the element or the elements even though it has a singular form.

Operations of a method may be performed in an appropriate order unless explicitly described in terms of order or described to the contrary. In addition, examples or example terms (for example, "such as" and "etc.") are used for the purpose of description and are not intended to limit the scope of the disclosure unless defined by the claims.

In general, a value sensed by a camera may be expressed as a product of illumination, the color of an object, and the response of the camera as shown in Equation 1 below.

$$p = \int E(\lambda) S(\lambda) R(\lambda) d\lambda \quad \text{[Equation 1]}$$

where p indicates a sensed value, and $E(\lambda)$, $S(\lambda)$, and $R(\lambda)$ respectively indicate illumination, the surface reflectance of an object, and the response of a camera as functions of spectrum $\lambda$. Because a value sensed by a camera is affected by illumination, the color of an image captured by the camera is also affected by illumination. White balance is a technique for eliminating such influences and photographing the unique color of an object as maximally as possible.

A photographing apparatus such as a smartphone senses light in three spectra, that is, R, G, and B spectra. Then, the photographing apparatus performs conversion using the three sensed values to express colors as intended. In methods of the related art, an RGB image is first captured, and then white balancing is performed by analyzing information contained in the RGB image. However, such methods are based on the Gray World Assumption or have other limiting conditions, and may thus work improperly when the Gray World Assumption or the limiting conditions are not satisfied.

Furthermore, in methods of the related art, an image is first obtained using an RGB camera, and then white balancing is performed using information about the image. Because RGB cameras basically sense the spectra of three colors and use a wide band filter for each color, there is a limit to obtaining accurate spectral information by using RGB cameras. Therefore, there is a limit to performing accurate white balancing. This limit arises especially when an object is illuminated with more than one light, and techniques of the related art have a limit to separating illuminations from each other. For example, when photographing a person with natural light coming through a left window and illumination light coming from a right-side indoor light, the left and right sides of the face of the person may have different colors. In addition, errors may occur when a specific color is dominant in a scene. For example, in a photograph of a ski resort with snow in the background, the color of the snow may appear different from the actual color of the snow.

For accurate white balancing, an image acquisition apparatus of an embodiment may separate illumination from the color of an object by using a multispectral image (MSI) sensor to find the exact color of the object, and may then perform white balancing by performing color conversion or mapping on an RGB image by using information about the illumination, that is, an illumination value, obtained by using the MSI sensor.

FIG. 1 is a block diagram illustrating a schematic structure of an image acquisition apparatus according to an embodiment.

Referring to FIG. 1, the image acquisition apparatus includes a first image sensor 100, a second image sensor 200, and a processor 500. The image acquisition apparatus of the embodiment accurately performs white balancing on images captured with a plurality of image sensors. The first image sensor 100 acquires a first image in a first wavelength band. The second image sensor 200 acquires a second image in a second wavelength band. The second wavelength band may include the first wavelength band and may be wider than the first wavelength band. Here, the first image sensor 100 may include an RGB image sensor, and the second image sensor 200 may include an MSI sensor. The RGB image sensor has an R channel, a G channel, and a B channel. The MSI sensor has more channels than the RGB image sensor and thus senses light in more wavelength bands than the RGB image sensor.

The processor 500 registers the first image and the second image, which are respectively output from the first image sensor 100 and the second image sensor 200, to obtain a registration image, and performs color conversion on the registration image by using an illumination value estimated from the second image.

In addition, the processor 500 may divide the first image into one or more regions, estimate illumination values respectively for regions of the second image, which respectively correspond to the regions of the first image, and may perform color conversion on the regions of the first image by using the illumination values estimated respectively for the regions of the second image.

In addition, when the difference between illumination values estimated for adjacent regions of the second image is equal to or greater than a first threshold value, the processor 500 may adjust one of the illumination values of the adjacent regions to decrease the difference to a value less than the first threshold value. In this case, the processor 500 may perform post-processing on a boundary portion between the adjacent regions after the color conversion.

Figure 2:
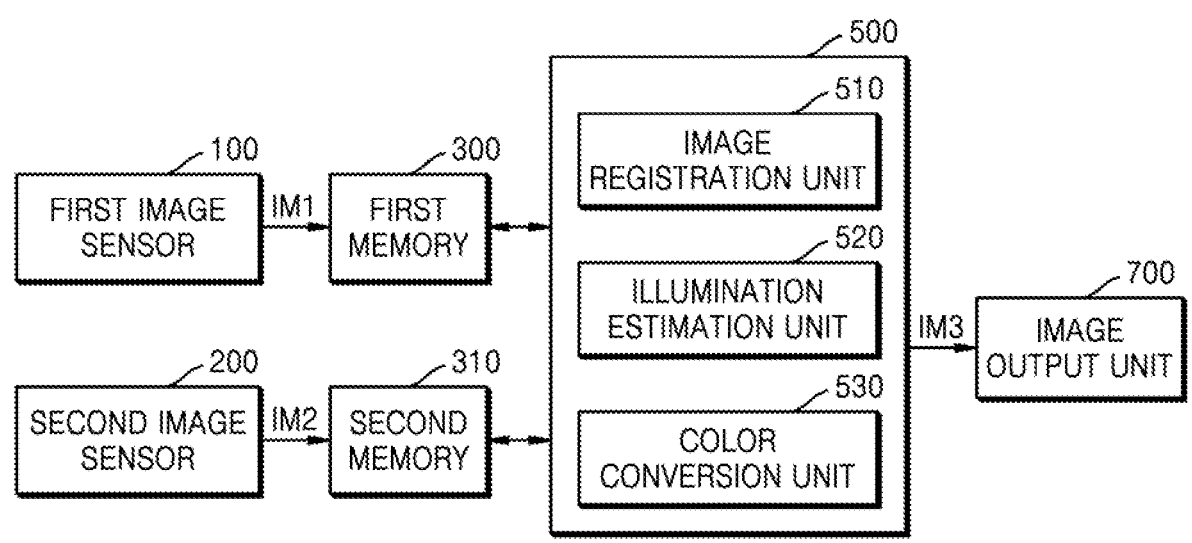
FIG. 2 is a detailed block diagram illustrating the image acquisition apparatus shown in FIG. 1.

FIG. 2 is a detailed block diagram illustrating the image acquisition apparatus shown in FIG. 1.

Referring to FIG. 2, the image acquisition apparatus includes: the first image sensor 100 configured to acquire a first image IM1 based on the first wavelength band; the second image sensor 200 configured to acquire a second image IM2 based on the second wavelength band; and the processor 500 configured to generate a third image IM3 by performing a signal processing process on the first image IM1 and the second image IM2. Here, the third image IM3 is generated by white balancing the first image IM1 which is acquired using the first image sensor 100, or by white balancing an image, which is obtained by registering the first image IM1 acquired from the first image sensor 100 and the second image IM2 acquired from the second image sensor 200.

The first image sensor 100 may be a sensor used in a general RGB camera such as a complementary metal oxide semiconductor (CMOS) image sensor including a Bayer color filter array. The first image IM1 acquired using the first image sensor 100 may be an RGB image based on red, green, and blue. The first image sensor 100 generally has a bandwidth of 380 nm to 780 nm.

The second image sensor 200 may be a sensor capable of sensing light at more wavelengths than the first image sensor 100. The second image sensor 200 may use, for example, 16 channels, 31 channels, or another number of channels. The second image sensor 200 may have more channels than the first image sensor 100. The bandwidth of each channel may be set to be narrower than R, G, and B bandwidths, and the total band which is the sum of the bands of all the channels may include and may be wider than RGB bands, that is, the total band (e.g., a combined transmission wavelength band) may include and may be wider than a visible light band. For example, the second image sensor 200 may have a bandwidth of 10 nm to 1000 nm. Also, the second image sensor may have a bandwidth of about 350 nm to 1000 nm. The second image IM2 acquired using the second image sensor 200 may be a multispectral or hyperspectral image, and may be an image based on wavelengths in 16 or more channels into which a wavelength band wider than the RGB wavelength bands is divided, for example, a wavelength band including the visible wavelength band and ranging from the ultraviolet wavelength band to the infrared wavelength band is divided. The second image IM2 may be acquired using all available channels of the second image sensor 200 or may be acquired using selected channels of the second image sensor 200. The spatial resolution of the second image IM2 may be lower than that of the first image IM1, but is not limited thereto.

In an embodiment, the first image sensor 100 may include an RGB image sensor, and the second image sensor 200 may include an MSI sensor. In this case, the RGB image sensor may be a CMOS image sensor. The RGB image sensor may use a Bayer color filter array to generate a three-channel image by sensing spectra respectively representing R, G, and B. However, the RGB senor may use another type of color filter array. The MSI sensor may sense and express light of wavelengths different from wavelengths that the RGB image sensor senses and expresses. The MSI sensor has more channels than the RGB image sensor and thus senses more wavelengths. For example, the MSI sensor may have 16 channels. In another example, the MSI sensor may have 31 channels. The transmission band, transmission amount, and transmission bandwidth of each of the channels may be adjusted for sensing light in a desired band. The total bandwidth which is the sum of the bandwidths of all the channels may include and may be wider than the bandwidth of a general RGB image sensor. The sensing spectra or wavelength bands of the RGB image sensor and the MSI sensor will be described later with reference to FIGS. 5 and 9.

The first image sensor 100 and the second image sensor 200 may be provided as separate chips or a single chip.

In an embodiment, timing control may be performed according to different resolutions and output speeds of different types of sensors and the size of a region required for image registration. For example, when reading an RGB image column in an operation based on the RGB image sensor, an image column of the MSI sensor, which corresponds to the RGB image column, may be previously stored in a buffer or may be read anew. Signals sensed by calculating such a timing may be read out. Alternatively, the operations of the two sensors may be synchronized using the same synchronization signal. In addition, focus control may be performed to focus both the sensors on the same position of an object.

In an embodiment, the MSI sensor may acquire an image through all the channels, for example, 16 channels, or through specific channels. Only specific channels may be used by binning sensor pixels, or selecting or synthesizing the specific channels.

Referring to FIG. 2, a first memory 300 stores the first image IM1 read out from the first image sensor 100. A second memory 310 stores the second image IM2 read out from the second image sensor 200.

Images are read out on a line basis from the first image sensor 100 and the second image sensor 200 and are sequentially stored. The first memory 300 and the second memory 310 may be line memories for storing images on a line basis or frame buffers for storing the entire images.

In an embodiment, when outputting images, only RGB images may be output, and the RGB images may be stored in a frame buffer. In this case, MSI images may be stored in a line buffer and may be processed on a line basis, and then the RGB images in the frame buffer may be updated. The first and second memories 300 and 310 may be static random access memories (SRAMs) or dynamic random access memories (DRAMs). However, the types of the first and second memories 300 and 310 are not limited.

The first and second memories 300 and 310 may be provided outside the first and second image sensors 100 and 200 or may be integrated into the first and second image sensors 100 and 200. In the latter case, a method of integrating a memory into a sensor by constructing each stack with a pixel unit, a circuit unit, and a memory, and integrating two stacks as one chip may be used. Alternatively, three layers respectively including a pixel unit, a circuit unit, and a memory may be formed as three stacks.

In the embodiment described above, the first image IM1 and the second image IM2 respectively acquired using the first image sensor 100 and the second image sensor 200 are stored in different memories, that is, the first memory 300 and the second memory 310. However, embodiments are not limited thereto, and the first image IM1 and the second image IM2 may be stored in one memory.

The processor 500 includes an image registration unit 510, an illumination estimation unit 520, and a color conversion unit 530. Although not shown in FIG. 2, the processor 500 may further include an image signal processor (hereinafter referred to as an ISP). The ISP may perform a basic image processing process on images respectively acquired from the first image sensor 100 and the second image sensor 200 before or after the images are respectively stored in the first memory 300 and the second memory 310. For example, the ISP may perform bad pixel correction, fixed pattern noise correction, crosstalk reduction, remosaicing, demosaicing, false color reduction, denoising, chromatic aberration correction, or the like. In addition, the processor 500 or the ISP may perform the same image processing process or different image processing processes for the first image sensor 100 and the second image sensor 200.

In an embodiment, the processor 500 may perform accurate white balancing by separating illumination from the color of an object by using the MSI sensor to find the exact color of the object, and then converting the color of an image acquired from the RGB image sensor or the color of a registration image by using an illumination value. The functions of the processor 500 will now be described.

The image registration unit 510 registers the first image IM1 and the second image IM2 which are respectively output from the first image sensor 100 and the second image sensor 200.

The image registration unit 510 may register the first image IM1 and the second image IM2 by using information on the relative positions of the first image sensor 100 and the second image sensor 200. The image registration unit 510 may find a positional relationship between image pixels by considering the spatial resolutions of images obtained using the first image sensor 100 and the second image sensor 200, the field of view and focal length of an optical system used to capture the images, and the like. In this case, an image acquired using one sensor (e.g., the first or second image sensor) may be set as a reference image, and another image acquired using another sensor may be overlaid on the reference image. For example, the first image IM1 obtained using the first image sensor 100 may be set as a reference image, and pixels corresponding to the pixels of the first image IM1 may be found from the pixels of the second image IM2 obtained using the second image sensor 200. To this end, scaling, translation, rotation, affine transform, perspective transform, or the like may be performed on the pixels of the second image IM2.

In addition, one or more pixels of the second image IM2 may correspond to the pixels of the first image IM1 and a pixel value of the second image IM2 corresponding to the pixels of the first image IM1 may be obtained by mixing the pixels of the second image IM2 at a certain ratio according to the positions of the pixels of the second image IM2. Channel-based images of the second image IM2 may be used for image registration. The image registration may be performed on a sub-pixel basis to increase the accuracy of the image registration. In the sub-pixel-based image registration, the position of each pixel may be expressed using real numbers instead of integers.

The image registration unit 510 may also increase the efficiency of image registration by controlling the first image sensor 100 and the second image sensor 200 to focus on the same position of an object. In addition, when the first image sensor 100 and the second image sensor 200 have the same field of view, the image registration may be performed quickly and accurately. For example, when imaging optical systems for forming optical images on the first image sensor 100 and the second image sensor 200 have the same focal length and the same field of view, only translation may occur between the first image IM1 and the second image IM2, and relevant parameters may be calculated using the relative positions of the first image sensor 100 and the second image sensor 200 and the focal length of the imaging optical systems.

When the spatial resolution of the second image IM2 is greater than the spatial resolution of the first image IM1 image registration may be performed by downsampling the second image IM2. In this case, filtering such as bi-lateral filtering or guided filtering, which considers edge information, may be used for the downsampling, thereby improving the accuracy of the image registration.

When the spatial resolution of the second image IM2 is less than the spatial resolution of the first image IM1, a second image sample corresponding to the position of each pixel of the first image IM1 may be generated for each channel by interpolation. Similarly, the interpolation may be performed using bi-lateral filtering, guided filtering, or the like to consider edge information.

Alternatively, image registration may be performed after adjusting the spatial resolution of the second image IM2 to be equal to the spatial resolution of the first image IM1. Demosaicing may be performed to adjust the resolutions of the first image IM1 and the second image IM2 to be equal to each other. In this case, when two optical systems for forming optical images on the first image sensor 100 and the second image sensor 200 have the same focal length and the same field of view, image registration may be performed by considering only translation without considering interpolation. For example, when the first image sensor 100 and the second image sensor 200 have the same focal point and the same field of view, there may be only a translation between images obtained using the first image sensor 100 and the second image sensor 200, and translation parameters may be calculated using camera extrinsic parameters including the relative positions of the first image sensor 100 and the second image sensor 200 and camera intrinsic parameters including the focal lengths of the first image sensor 100 and the second image sensor 200.

Before image registration, aberrations of the first image IM1 and the second image IM2 may be corrected. That is, image registration may be performed after correcting the influences of distortion, geometric aberrations, chromatic aberration, and the like, which are caused by lenses of the imaging optical systems used to obtain the first image IM1 and the second image IM2.

The image registration unit 510 may extract edge feature information from the first and second images IM1 and IM2 and may perform feature matching between the first and second images IM1 and IM2. Because color distortion may occur when image registration is not correct in a boundary region of an object, image registration may be performed by using extracted edge information to align edges of two images, thereby preventing distortion in a boundary region between the two images. Image registration may be performed by using image features such as corner points other than edge features.

In addition, the image registration unit 510 may perform image registration on a pixel group basis instead of a pixel basis. For example, after classifying the pixels of an RGB image into groups, image registration may be performed by matching corresponding groups of an MSI image with the pixel groups of the RGB image. Here, the pixel groups may be arranged in a pattern such that each pixel group has a given size and shape. For example, each pixel group may have a line shape or a rectangular block shape. For example, after dividing an RGB image into rectangular regions and finding MSI regions corresponding to the rectangular regions, white balancing may be performed using information on the MSI regions, and the rectangular regions of the RGB image may be converted using information found by the white balancing. The pixel groups may be classified into a foreground object region and a background region. In addition, the pixel groups may be classified into a region of interest (hereinafter referred to as an ROI) and a non-ROI. In addition, the pixel groups may be classified by considering image segmentation or color distribution.

The illumination estimation unit 520 estimates an illumination value from the second image IM2 acquired from the second image sensor 200. The illumination estimation unit 520 may estimate illumination from an image obtained using the MSI sensor by using information on spectra in a plurality of channels. To this end, the illumination and the surface reflectance of an object may be expressed by spectral decomposition. That is, illumination E may be expressed by Equation 2 below, and the surface reflectance S of the object may be expressed by Equation 3 below.

$$E^x(\lambda) = \sum_{i=1}^{m} \epsilon_i^x E_i(\lambda) \qquad \text{[Equation 2]}$$

$$S^x(\lambda) = \sum_{j=1}^{n} \sigma_j^x S_j(\lambda) \qquad \text{[Equation 3]}$$

The product of the illumination E and the surface reflectance S represents a color, and a value sensed by the second image sensor 200 may be expressed by Equation 4 below.

$$\rho_k^x = \int E^x(\lambda) S^x(\lambda) R_k(\lambda) d\lambda = \sum_{i=1}^{m}\sum_{j=1}^{n} \epsilon_i^x \sigma_j^x g_{ijk} \qquad \text{[Equation 4]}$$

$$g_{ijk} \equiv \int E_i^x(\lambda) S_j^x(\lambda) R_k(\lambda) d(\lambda)$$

where m and n refer to the numbers of basis vectors used for spectral decomposition of an illumination spectrum and an object color spectrum, x refers to a spatial position, $\epsilon_i$ refers to a coefficient of basis vector $E_i$, $\sigma_j$ refers to a coefficient of basis vector $S_j$, and k refers to a channel index. The spectrum of illumination light may be estimated by calculating solutions of the linear equations through a method such as non-linear optimization.

In addition, optionally, the illumination estimation unit 520 may estimate illumination by using a neural network. The neural network may be trained using MSI sensor images with respect to predetermined illumination values, and then illumination may be estimated using the neural network. After training the neural network, an MSI sensor image may be input to the neural network, and then the neural network may output an illumination value.

The illumination estimation unit 520 may divide an image into pixel groups and may estimate illumination in a region of each pixel group. In this case, the pixel groups may be the same as the pixel groups used in the image registration unit 510.

The illumination estimation unit 520 may express results of illumination estimation as an illumination-wavelength function. Alternatively, basis functions may be predefined and the illumination-wavelength function may be spectrally decomposed into the basis functions multiplied by coefficients, and the results of illumination estimation may be expressed by the coefficients of the basis functions. In addition, the results of illumination estimation may be expressed using a color temperature index of illumination. Here, the use of a color temperature is a method of numerically expressing the light of an optical source in Kelvins (K). The color temperature varies depending on the type of illumination: the lower the color temperature is, the redder the color is; and the higher the color temperature is, the bluer the color is.

In addition, a set of illumination-wavelength functions may be defined in advance, and an index of the most approximate functions among the illumination-wavelength functions may be output. Even when a neural network is used, outputs may be defined as described above, and the neural network may be trained on the defined outputs.

In addition, the illumination estimation unit 520 may estimate illumination by using both the first image IM1 and the second image IM2 acquired using the first image sensor 100 and the second image sensor 200. In this case, the illumination estimation unit 520 may estimate illumination by separately using the first image IM1 and the second image IM2 and may then combine results of the estimation.

Alternatively, when the illumination estimation unit 520 estimates illumination through multiple channels, the illumination estimation unit 520 may consider all the channels of the first and second images IM1 and IM2.

In addition, when a neural network is used, the neural network may be trained by considering both the first image IM1, that is, an RGB image, and the second image IM2, that is, an MSI image under a specific illumination light. In this case, the RGB image and the MSI image may be input to the neural network, and then the neural network may output an estimated illumination value.

The color conversion unit 530 performs color conversion on a registration image obtained from the image registration unit 510 by using the illumination value estimated by the illumination estimation unit 520.

The color conversion unit 530 performs color mapping for each pixel group used in the image registration unit 510 and the illumination estimation unit 520. Here, R, G, and B values of each pixel may be input for color mapping, and then R', G', and B' values obtained by correcting the input R, G, and B values by considering illumination may be output. A 3×3 matrix operation may be used as shown in Equation 5 below for converting an input vector I=[R G B]$^T$ into an output vector I'=[R' G' B' ]$^T$.

$$I' = MI \qquad \text{[Equation 5]}$$

where M may be a diagonal matrix (e.g., a conversion matrix) prepared for independently considering R, G, and B. Alternatively, M may be a non-diagonal matrix for generating R', G', and B' by combining R, G, and B. Alternatively, M may be a matrix other than a 3×3 matrix to consider cross-terms or quadratic terms of R, G, and B. In this case, the input vector I may include a cross-term or a quadratic term in addition to R, G, and B. A plurality of matrixes M may be predetermined according to color temperatures. Alternatively, the matrixes M may be predetermined according to an index of predetermined illumination functions. Alternatively, an optimized matrix may be prepared through non-linear optimization using an illumination function to obtain more accurate results.

The color conversion unit 530 may prevent boundary artifacts from occurring at a boundary between adjacent regions after region-based color conversion. To this end, the difference between illumination functions of adjacent regions may be adjusted to be not greater than a predetermined value. In addition, after color conversion, boundary regions may be post-processed for smooth color conversion.

Figure 3:
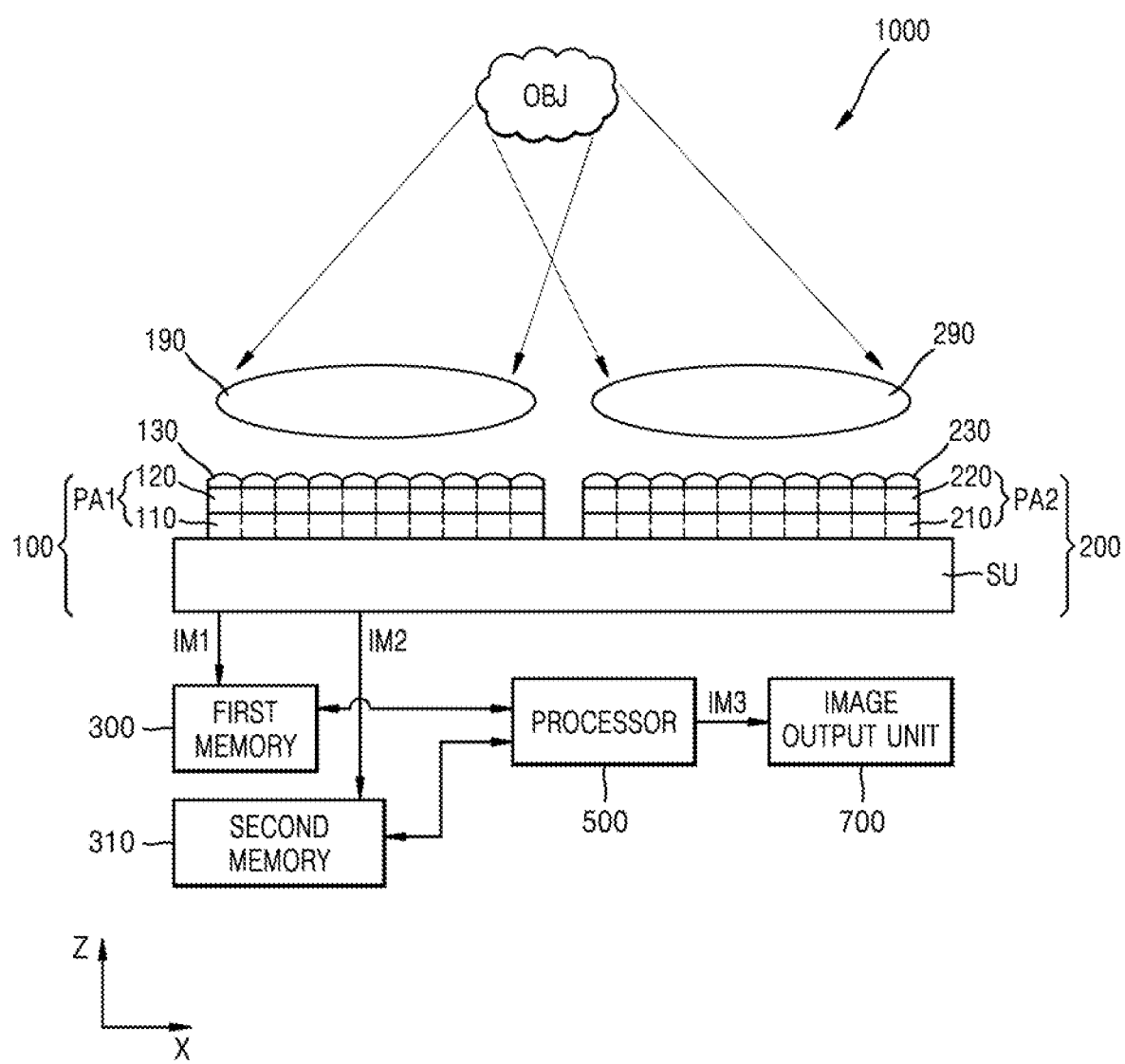
FIG. 3 is a conceptual diagram illustrating a schematic structure of the image acquisition apparatus shown in FIG. 1.
Figure 4:
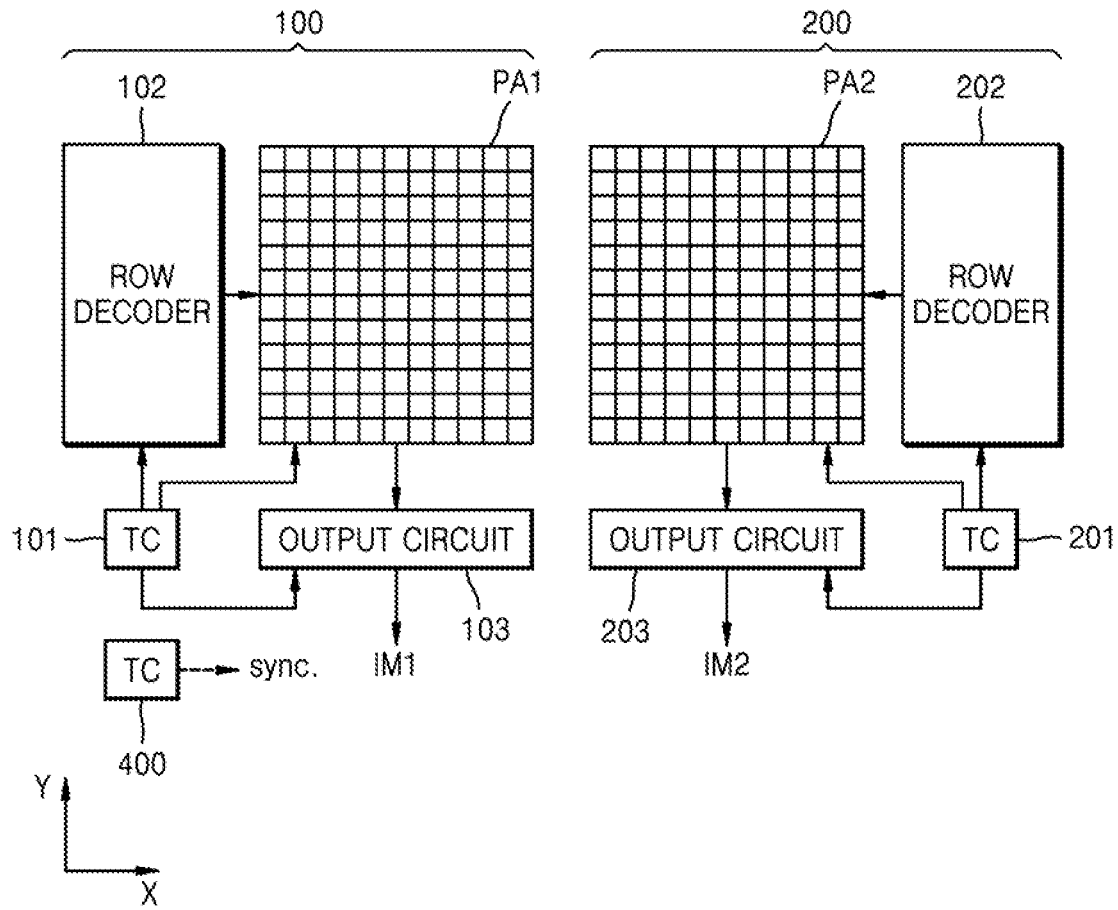
FIG. 4 is a view illustrating circuit configurations of first and second image sensors provided in the image acquisition apparatus according to an embodiment.

FIG. 3 is a conceptual diagram illustrating a schematic structure of an image acquisition apparatus 1000 according to an embodiment, and FIG. 4 is a view illustrating circuit configurations of first and second image sensors 100 and 200 provided in the image acquisition apparatus 1000 according to an embodiment.

The image acquisition apparatus 1000 includes: the first image sensor 100 configured to acquire a first image IM1 based on a first wavelength band; the second image sensor 200 configured to acquire a second image IM2 based on a second wavelength band; and a processor 500 configured to generate a third image IM3 by performing a signal processing process on the first image IM1 and the second image IM2. The image acquisition apparatus 1000 may further include the first memory 300 configured to store data about the first image IM1, a second memory 310 configured to store data about the second image IM2, and an image output unit 700 configured to output images.

The image acquisition apparatus 1000 may further include: a first imaging optical system 190 configured to form an optical image of an object OBJ on the first image sensor 100; and a second imaging optical system 290 configured to form an optical image of the object OBJ on the second image sensor 200. Although each of the first imaging optical system 190 and the second imaging optical system 290 is illustrated as including one lens, this is a non-limiting example. The first imaging optical system 190 and the second imaging optical system 290 may be configured to have the same focal length and the same field of view, and in this case, a process of registering the first image IM1 and the second image IM2 to form a third image IM3 may be more easily performed. However, embodiments are not limited thereto.

The first image sensor 100 includes a first pixel array PA1. The first pixel array PA1 includes: a first sensor layer 110, in which a plurality of first sensing elements are arrayed; and a color filter 120 arranged on the first sensor layer 110. The color filter 120 may include red filters, green filters, and blue filters, which are alternately arranged. A first micro-lens array 130 may be arranged on the first pixel array PA1. Various examples of pixel arrangements of the first pixel array PA1 will be described later with reference to FIGS. 5 to 8.

The second image sensor 200 includes a second pixel array PA2. The second pixel array PA2 includes: a second sensor layer 210 in which a plurality of second sensing elements are arrayed; and a spectral filter 220 arranged on the second sensor layer 210. The spectral filter 220 includes a plurality of filter groups, and each of the plurality of filter groups may include a plurality of unit filters having different transmission wavelength bands. The spectral filter 220 may be configured to filter light in a wavelength band wider than the wavelength band in which the color filter 120 filters light. For example, the spectral filter 220 may be configured to filter light in a wavelength band ranging from the ultraviolet wavelength band to the infrared wavelength band by dividing the wavelength band into more sub-bands than sub-bands in which the color filter 120 filters light. A first micro-lens array 230 may be arranged on the second pixel array PA2. Examples of pixel arrangements of the second pixel array PA2 will be described later with reference to FIGS. 10 to 12.

Each of the first sensor layer 110 and the second sensor layer 210 may include, but are not limited to, a charge coupled device (CCD) sensor or a CMOS sensor.

The first pixel array PA1 and the second pixel array PA2 may be horizontally arranged on a same circuit board SU, for example, apart from each other in an X direction as shown in FIG. 3.

The circuit board SU may include: first circuit elements for processing a signal from the first sensor layer 110; and second circuit elements for processing a signal from the second sensor layer 210. However, embodiments are not limited thereto, and the first circuit elements and the second circuit elements may be respectively provided on separate substrates.

Although the first and second memories 300 and 310 in which data on the first image IM1 and data on the second image IM2 are stored are shown separately from the circuit board SU, this is merely an example, and the first and second memories 300 and 310 may be arranged in the same layer as the first and second circuit elements of the circuit board SU or may be arranged in a layer different from the layer in which the first and second circuit elements are arranged. Each of the first and second memories 300 and 310 may be a line memory configured to store an image line by line, or a frame buffer configured to store the entire image. Each of the first and second memories 300 and 310 may include a static random access memory (SRAM) or a dynamic random access memory (DRAM).

Various circuit elements necessary for the image acquisition apparatus 1000 may be integrated into the circuit board SU. For example, the circuit board SU may include: a logic layer including various analog circuits and digital circuits; and a memory layer in which data is stored. The logic layer and the memory layer may be provided as different layers or the same layer.

Referring to FIG. 4, a row decoder 102, an output circuit 103, and a timing controller (TC) 101 are connected to the first pixel array PA1. The row decoder 102 selects one row of the first pixel array PA1 in response to a row address signal output from the TC 101. The output circuit 103 outputs, in units of columns, photo-sensing signals from a plurality of pixels arranged along a selected row. To this end, the output circuit 103 may include a column decoder and an analog-to-digital converter (ADC). For example, the output circuit 103 may include a plurality of ADCs respectively arranged for columns between the column decoder and the first pixel array PA1, or may include one ADC arranged at an output terminal of the column decoder. The TC 101, the row decoder 102, and the output circuit 103 may be implemented as one chip or as separate chips. At least some of the illustrated circuit elements may be provided on the circuit board SU shown in FIG. 3. A processor for processing the first image IM1 output through the output circuit 103 may be implemented as a single chip together with the TC 101, the row decoder 102, and the output circuit 103.

A row decoder 202, an output circuit 203, and a TC 201 are also connected to the second pixel array PA2, and a signal from the second pixel array PA2 may be processed as described above. In addition, a processor for processing the second image IM2 output from the output circuit 203 may be implemented as a single chip together with the TC 201, the row decoder 202, and the output circuit 203.

Although the first pixel array PA1 and the second pixel array PA2 are shown in FIG. 4 as having the same size and the same number of pixels, this is merely a non-limiting example for ease of illustration.

When operating two different types of sensors, timing control may be required according to the different resolutions and output speeds of the sensors and the size of a region required for image registration. For example, when one image column is read based on the first image sensor 100, an image column of the second image sensor 200 corresponding thereto may have already been stored in a buffer or may need to be read anew. Alternatively, the operations of the first image sensor 100 and the second image sensor 200 may be synchronized using the same synchronization signal. For example, a TC 400 may be further provided to transmit a synchronization signal (sync.) to the first image sensor 100 and the second image sensor 200.

Figure 5:
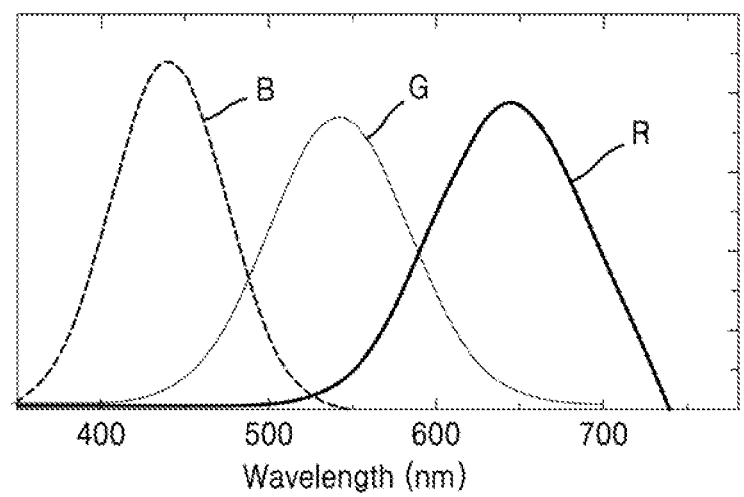
FIG. 5 is a graph illustrating a wavelength spectrum obtained using the first image sensor provided in the image acquisition apparatus according to an embodiment.
Figure 6:
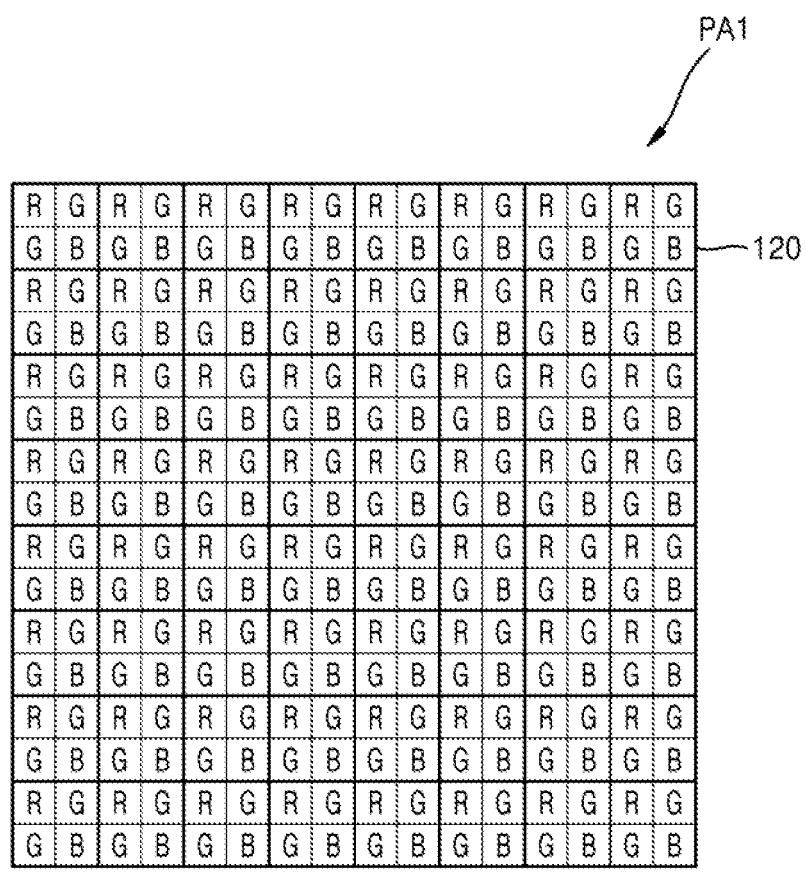
FIGS. 6 to 8 are views illustrating examples of pixel arrangements of the first image sensor provided in the image acquisition apparatus according to embodiments.
Figure 7:
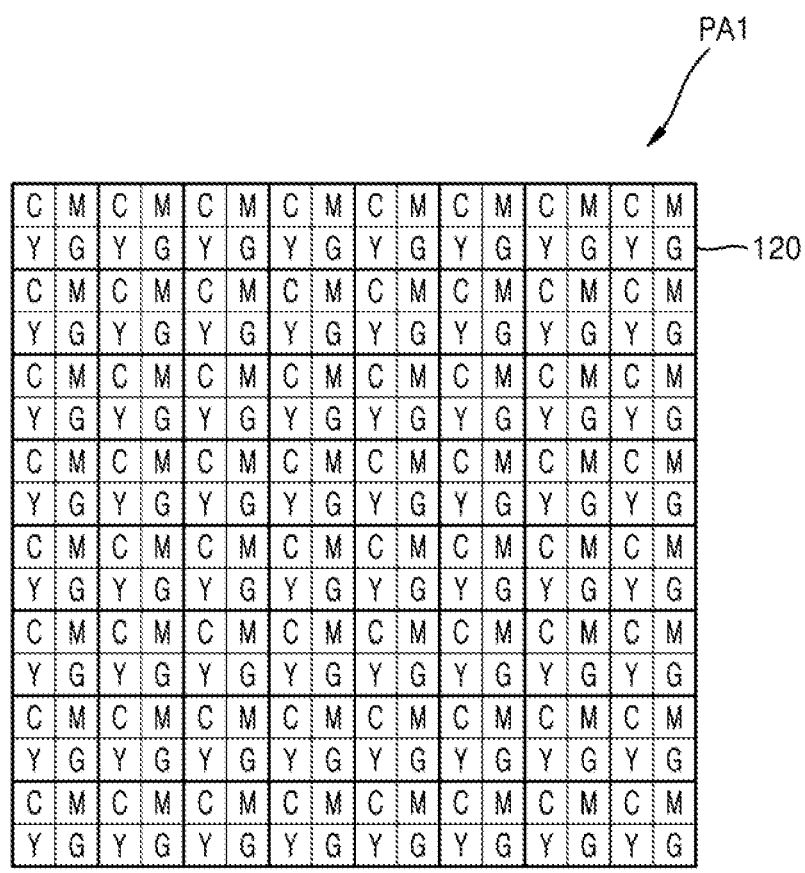
Figure 8:
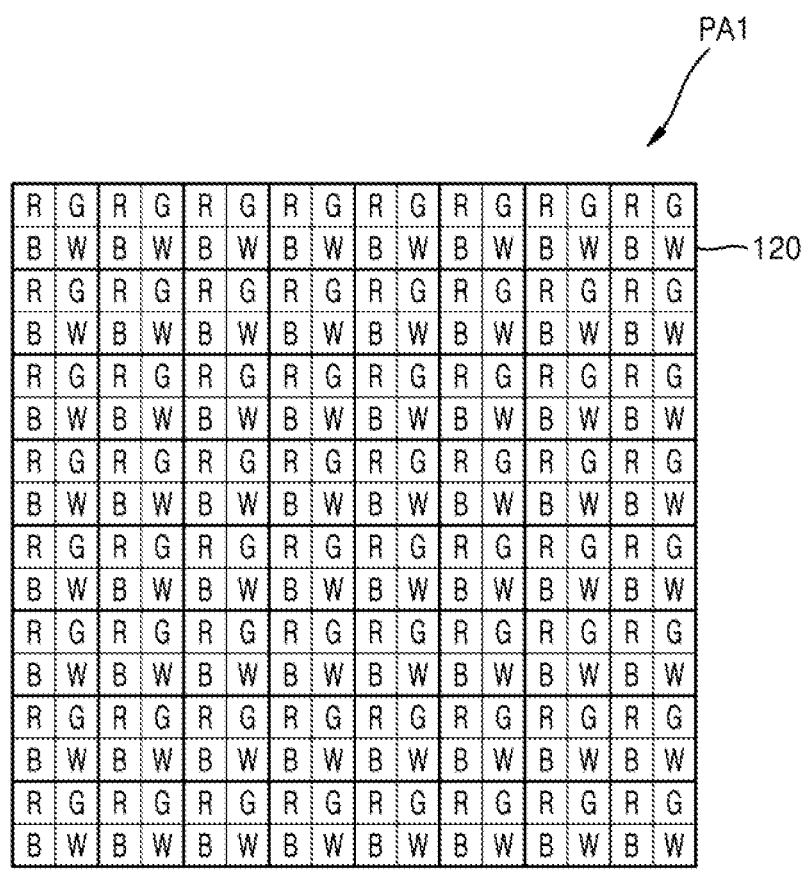

FIG. 5 is a graph illustrating a wavelength spectrum obtained with the first image sensor 100 provided in the image acquisition apparatus 1000 according to an embodiment, and FIGS. 6 to 8 are views illustrating examples of pixel arrangements of the first image sensor 100 provided in the image acquisition apparatus 1000 according to embodiments;

Referring to FIG. 6, in the color filter 120 provided in the first pixel array PA1, the filters for filtering in the red R, green G, and blue B wavelength bands are arranged in a Bayer pattern. That is, one unit pixel includes sub-pixels arranged in a 2×2 array, and a plurality of unit pixels are repeatedly arranged two-dimensionally. A red filter and a green filter are arranged in a first row of a unit pixel, and a green filter and a blue filter are arranged in a second row. The pixels may be arranged in another pattern other than the Bayer pattern.

For example, referring to FIG. 7, a CYGM arrangement, in which a magenta pixel M, a cyan pixel C, a yellow pixel Y, and a green pixel G form one unit pixel, may also be possible. In addition, referring to FIG. 8, an RGBW arrangement, in which a green pixel G, a red pixel R, a blue pixel B, and a white pixel W form one unit pixel, may also be possible. Furthermore, although not shown in FIGS. 6 to 8, the unit pixel may have a 3×2 array pattern. In addition, the pixels of the first pixel array PA1 may be arranged in various patterns according to color characteristics of the first image sensor 100.

Figure 9:
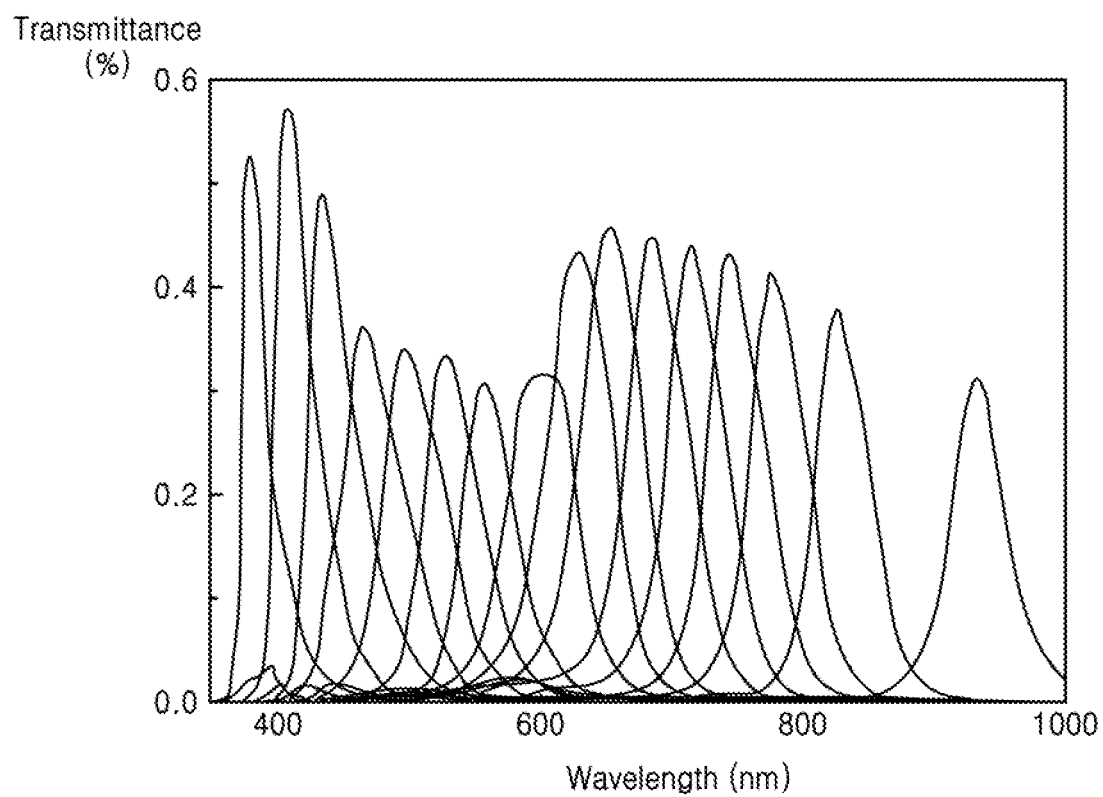
FIG. 9 is a graph illustrating a wavelength spectrum obtained using the second image sensor provided in the image acquisition apparatus according to an embodiment.
Figure 10:
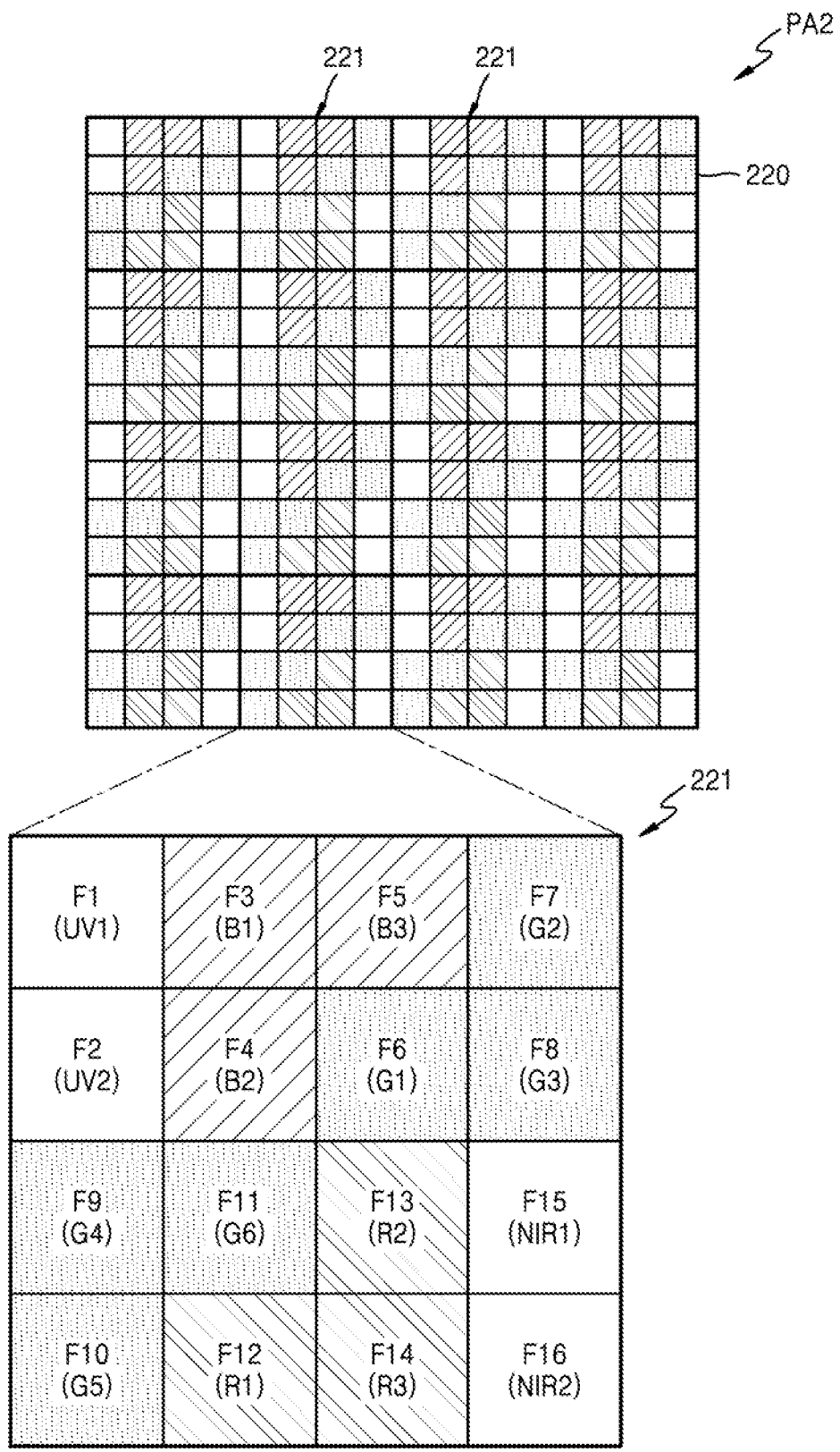
Figure 11:
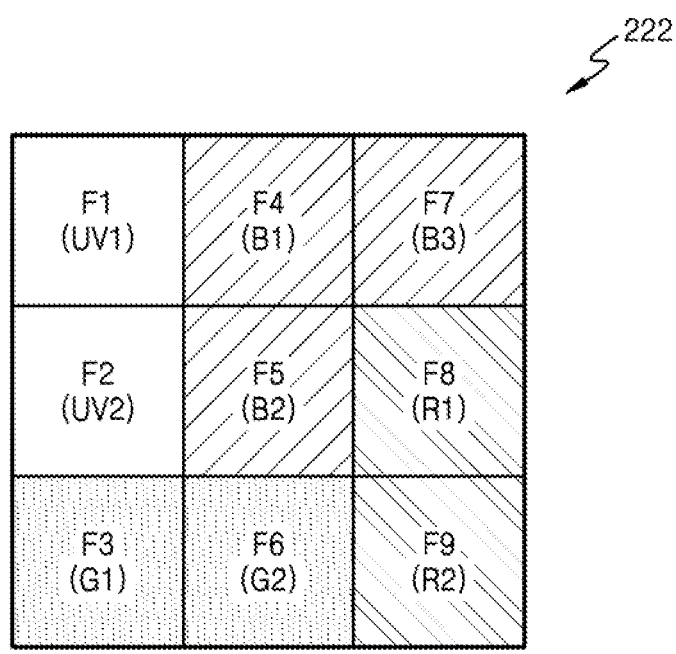

FIG. 9 is a graph illustrating a wavelength spectrum obtained using the second image sensor 200 provided in the image acquisition apparatus 1000 according to an embodiment, and FIGS. 10 to 12 are views illustrating examples of pixel arrangements of the second image sensor 200 provided in the image acquisition apparatus 1000 according to embodiments.

Referring to FIG. 10, the spectral filter 220 provided in the second pixel array PA2 may include a plurality of filter groups 221 arranged in a two-dimensional form. Each of the filter groups 221 may include 16 unit filters, that is, first to sixteenth unit filters F1 to F16 arranged in a 4×4 array.

The first and second unit filters F1 and F2 may have center wavelengths UV1 and UV2 in an ultraviolet region, and the third to fifth unit filters F3 to F5 may have center wavelengths B1 to B3 in a blue light region. The sixth to eleventh unit filters F6 to F11 may have center wavelengths G1 to G6 in a green light region, and the twelfth to fourteenth unit filters F12 to F14 may have center wavelengths R1 to R3 in a red light region. In addition, the fifteenth and sixteenth unit filters F15 and F16 may have center wavelengths NIR1 and NIR2 in a near-infrared region.

FIG. 11 is a plan view illustrating one of filter groups 222 provided in the spectral filter 220 according to an embodiment. Referring to FIG. 11, the filter group 222 may include nine unit filters, that is, first to ninth unit filters F1 to F9 arranged in a 3×3 array. The first and second unit filters F1 and F2 may have center wavelengths UV1 and UV2 in an ultraviolet region, and the fourth, fifth, and seventh unit filters F4, F5, and F7 may have center wavelengths B1 to B3 in a blue light region. The third and sixth unit filters F3 and F6 may have center wavelengths G1 and G2 in a green light region, and the eighth and ninth unit filters F8 and F9 may have center wavelengths R1 and R2 in a red light region.

FIG. 12 is a plan view illustrating one of filter groups 223 provided in the spectral filter 220 according to an embodiment. Referring to FIG. 12, the filter group 223 may include 25 unit filters, that is, first to twenty-fifth F1 to F25 arranged in a 5×5 array. The first to third unit filters F1 to F3 may have center wavelengths UV1 to UV3 in an ultraviolet region, and the sixth, seventh, eighth, eleventh, and twelfth unit filters F6, F7, F8, F11, and F12 may have center wavelengths B1 to B5 in a blue light region. The fourth, fifth, ninth, sixteenth, seventeenth, twenty-first, and twenty-second unit filters F4, F5, F9, F16, F17, F21, and F22 may have center wavelengths G1 to G3 in a green light region, and the tenth, thirteenth, fourteenth, fifteenth, eighteenth, and nineteenth unit filters F10, F13, F14, F15, F18, and F19 may have center wavelengths R1 to R6 in a red light region. In addition, the twentieth, twenty-third, twenty-fourth, and twenty-fifth unit filters F20, F23, F24, and F25 may have center wavelengths NIR1 to NIR4 in a near-infrared region.

The above-described unit filters provided in the spectral filter 220 may have a resonance structure having two reflection plates, and the transmission wavelength band of the spectral filter 220 may be determined according to characteristics of the resonance structure. The transmission wavelength band may be adjusted according to the materials of the reflection plates, a dielectric material in a cavity of the resonance structure, and the thickness of the cavity. In addition, another structure such as a structure using a grating or a structure using a distributed Bragg reflector (DBR) may be applied to the unit filters.

Furthermore, the pixels of the second pixel array PA2 may be arranged in various manners according to color characteristics of the second image sensor 200.

Figure 13:
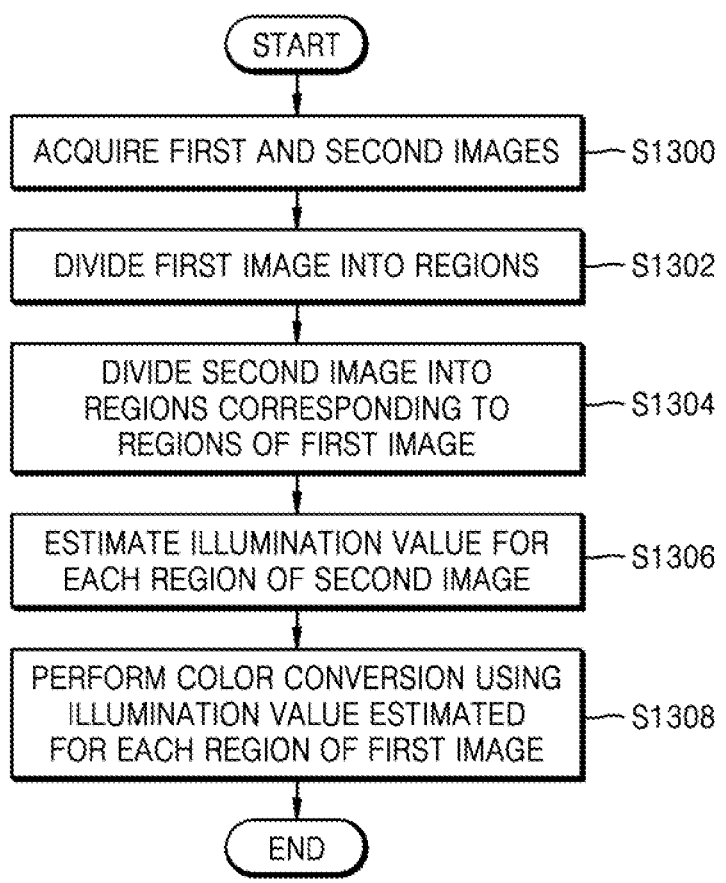
FIG. 13 is a flowchart illustrating a method of controlling an image acquisition apparatus according to an embodiment.

FIG. 13 is a flowchart schematically illustrating a method of controlling an image acquisition apparatus according to an embodiment.

Referring to FIG. 13, in operation S1300, a first image and a second image are acquired. Here, the first image is an RGB image obtained using a general RGB or CMOS image sensor. The second image is obtained using an MSI sensor. The second image may have a wavelength band wider than the wavelength band of the first image. In addition, the second image has more channels than three channels, that is, R, G, and B channels of the first image.

In operation S1302, the first image is divided into regions. Here, the first image may be divided into pixel groups or patterns having a preset size and shape. The patterns may be lines or squares. In addition, the pixel groups may be classified into a foreground and a background, or may be classified into an ROI and a non-ROI.

In operation S1304, the second image may be divided into regions respectively corresponding to the regions of the first image. In addition, one of the first and second images may be overlaid onto the other through registration of the first and second images. In addition, the registration for overlaying one of the first and second images onto the other may be performed in units of regions into which the first and second images are divided in operations S1302 and S1304. Although it has been described that the image registration is performed in units of pixel groups in operations S1302 and S1304, embodiments are not limited thereto, and the image registration may be performed in units of pixels or sub-pixels.

In operation S1306, an illumination value is estimated for each region of the second image. The illumination value may be estimated using multi-channel spectral information included in the second image which is acquired using an MSI sensor. Here, the illumination value is estimated for each of the regions into which the second image is divided.

In operation S1308, color conversion is performed using illumination values respectively estimated for the regions of the first image. Here, the first image may be an RGB image obtained using an RGB image sensor or a CMOS image sensor in operation S1300, or may be a registration image obtained by registration of the first and second images in operations S1302 and S1304.

In the method of controlling an image acquisition apparatus according to the embodiment, images captured using an RGB camera are white balanced using an RGB image sensor and an MSI sensor. For accurate white balancing, illumination may be separated from the color of an object to find the exact color of the object, and then, an RGB image of the object may be white balanced through color mapping based on information the illumination.

The image acquisition apparatus 1000 described above may be employed in various high-performance optical apparatuses or electronic apparatuses. Examples of the electronic apparatuses may include smartphones, mobile phones, cellular phones, personal digital assistants (PDAs), laptop computers, personal computers (PCs), various portable devices, home appliances, security cameras, medical cameras, automobiles, Internet of Things (IoT) devices, and mobile or non-mobile computing devices, but are not limited thereto.

In addition to the image acquisition apparatus 1000, the electronic apparatuses may further include a processor for controlling image sensors provided therein, for example, an application processor (AP). The electronic apparatuses may control a plurality of hardware or software components by driving an operating system or an application program in the processor and may perform various data processing and operations. The processor may further include a graphics processing unit (GPU) and/or an ISP. When the processor includes an ISP, an image (or video) obtained using an image sensor may be stored and/or output using the processor.

Figure 14:
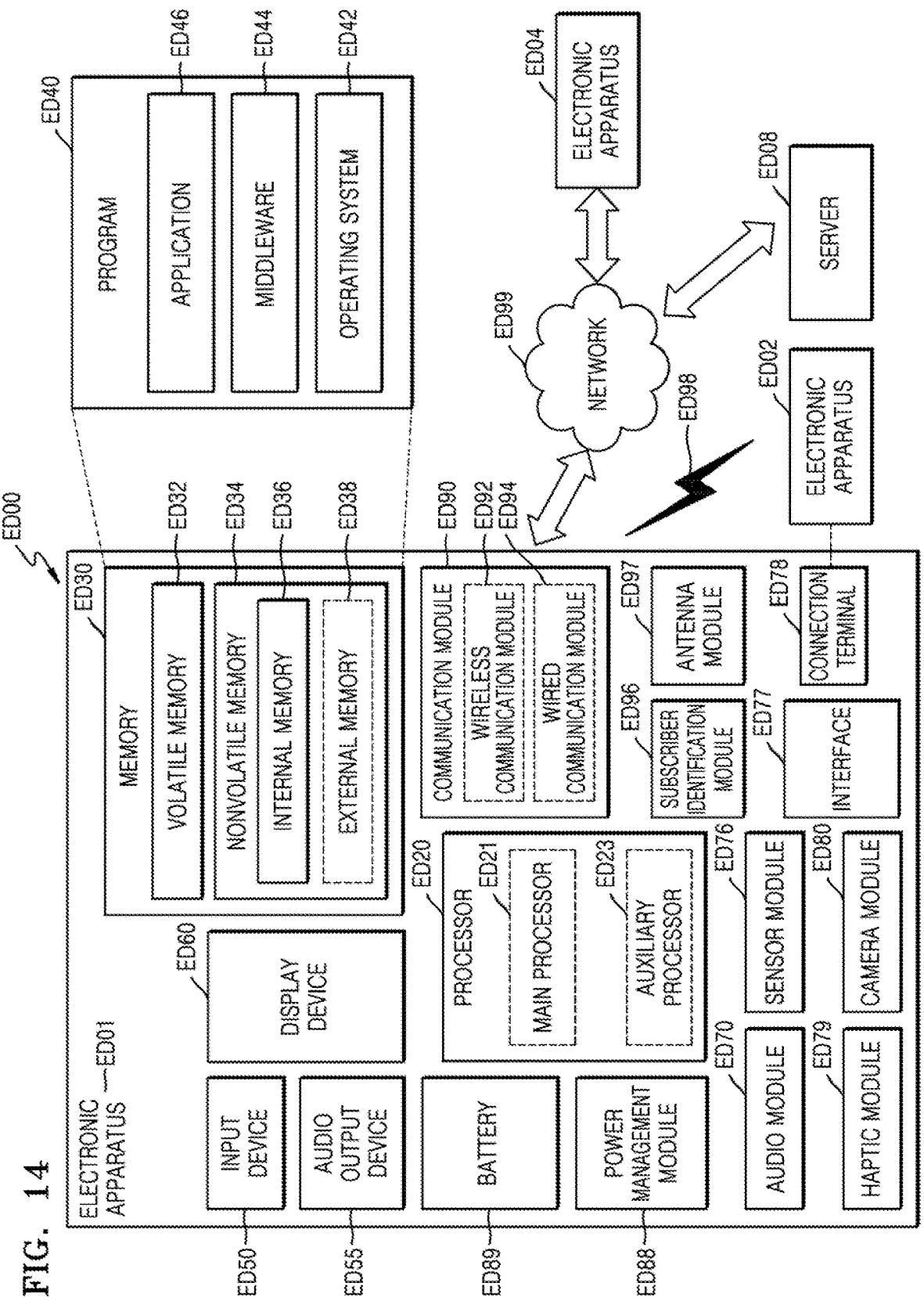
FIG. 14 is a block diagram illustrating a schematic structure of an electronic apparatus according to an embodiment.

FIG. 14 is a block diagram including a schematic structure of an electronic apparatus ED01 according to an embodiment. Referring to FIG. 14, in a network environment ED00, the electronic apparatus ED01 may communicate with another electronic apparatus ED02 through a first network ED98 (a near-field wireless communication network or the like) or may communicate with another electronic apparatus ED04 and/or a server ED08 through a second network ED99 (a far-field wireless communication network or the like). The electronic apparatus ED01 may communicate with the electronic apparatus ED04 through the server ED08. The electronic apparatus ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. Some (the display device ED60, etc.) of the components may be omitted from the electronic apparatus ED01, or other components may be added to the electronic apparatus ED01. Some of the components may be implemented in one integrated circuit. For example, the sensor module ED76 (a fingerprint sensor, an iris sensor, an illuminance sensor, etc.) may be embedded in the display device ED76 (a display or the like). In addition, when an image sensor has a spectral function, some sensor-module functions (color sensing, illuminance sensing, etc.) may be implemented in the image sensor instead of being implemented in the sensor module ED76.

The processor ED20 may execute software (a program ED40 or the like) to control one or more other components (hardware or software components, etc.) of the electronic apparatus ED01 connected to the processor ED20, and may perform a variety of data processing or operations. As a portion of the data processing or operations, the processor ED20 may load instructions and/or data received from other components (the sensor module ED76, the communication module ED90, etc.) into a volatile memory ED32, process the instructions and/or data stored in the volatile memory ED32, and store result data in a nonvolatile memory ED34. The processor ED20 may include a main processor ED21 (a central processing unit, an application processor, or the like) and an auxiliary processor ED23 (a GPU, an ISP, a sensor hub processor, a communication processor, or the like), which is operated independently or together with the main processor ED21. The auxiliary processor ED23 may consume less power than the main processor ED21 and may perform specialized functions.

The auxiliary processor ED23 may control functions and/or states related to some (the display device ED60, the sensor module ED76, the communication module ED90, etc.) of the components of the electronic apparatus ED01 on behalf of the main processor ED21 while the main processor ED21 is in an inactive (e.g., sleep) state or together with the main processor ED21 while the main processor ED21 is in an active (e.g., application execution) state. The auxiliary processor ED23 (an ISP, a communication processor or the like) may be implemented as a portion of other functionally relevant components (the camera module ED80, the communication module ED90, etc.).

The memory ED30 may store a variety of data required by the components (the processor ED20, the sensor module ED76, etc.) of the electronic apparatus ED01. The data may include, for example, software (the program ED40, etc.) and input data and/or output data for commands related thereto. The memory ED30 may include the volatile memory ED32 and/or the nonvolatile memory ED34. The nonvolatile memory ED32 may include an internal memory ED36 fixed to the electronic apparatus ED01 and an external memory ED38 removable from the electronic apparatus ED01.

The program ED40 may be stored as software in the memory ED30, and may include an operating system ED42, middleware ED44, and/or an application ED46.

The input device ED50 may receive commands and/or data to be used for the components (the processor ED20, etc.) of the electronic apparatus ED01 from the outside (a user, etc.) of the electronic apparatus ED01. The input device ED50 may include a microphone, a mouse, a keyboard, and/or a digital pen (a stylus pen or the like).

The audio output device ED55 may output an audio signal to the outside of the electronic apparatus ED01. The audio output device ED55 may include a speaker and/or a receiver. The speaker may be used for general purposes such as multimedia playback or record playback, and the receiver may be used to receive incoming calls. The receiver may be provided as a portion of the speaker or may be implemented as a separate device.

The display device ED60 may visually provide information to the outside of the electronic apparatus ED01. The display device ED60 may include a display, a hologram device, or a projector, and a control circuit for controlling devices. The display device ED60 may include touch circuitry set to sense a touch, and/or sensor circuitry (a pressure sensor, etc.) configured to measure the intensity of force generated by the touch.

The audio module ED70 may convert sound into an electrical signal, and vice versa. The audio module ED70 may obtain sound through the input device ED50, or may output sound through the audio output device ED55 and/or speakers and/or headphones of another electronic apparatus (the electronic apparatus ED02 or the like) directly or wirelessly connected to the electronic apparatus ED01.

The sensor module ED76 may detect an operating state (power, temperature, etc.) of the electronic apparatus ED01 or an external environmental state (user status, etc.), and may generate an electrical signal and/or a data value corresponding to the detected state. The sensor module ED76 may include a gesture sensor, a gyro sensor, a barometric sensor, a magnetic sensor, an acceleration sensor, a grip sensor, a proximity sensor, a color sensor, an infrared (IR)

sensor, a biological sensor, a temperature sensor, a humidity sensor, and/or an illuminance sensor.

The interface ED77 may support one or more designated protocols, which may be used to directly or wirelessly connect the electronic apparatus ED01 with other electronic apparatuses (the electronic apparatus ED02, etc.). The interface ED77 may include a high definition multimedia interface (HDMI), a universal serial bus (USB) interface, a secure digital (SD) card interface, and/or an audio interface.

A connection terminal ED78 may include a connector through which the electronic apparatus ED01 may be physically connected to other electronic apparatuses (the electronic apparatus ED02, etc.). The connection terminal ED78 may include an HDMI connector, a USB connector, an SD card connector, and/or an audio connector (a headphone connector, etc.).

The haptic module ED79 may convert an electrical signal into a mechanical stimulus (vibration, movement, etc.) or an electrical stimulus that a user may perceive through tactile sensation or kinesthesia. The haptic module ED79 may include a motor, a piezoelectric element, and/or an electric stimulation device.

The camera module ED80 may capture a still image and a moving image. The camera module ED80 may include the image acquisition apparatus 1000 described above, and may further include a lens assembly, an ISP, and/or a flash. The lens assembly included in the camera module ED80 may collect light coming from an object to be imaged.

The power management module ED88 may manage power supplied to the electronic apparatus ED01. The power management module ED88 may be implemented as a portion of a power management integrated circuit PMIC.

The battery ED89 may supply power to components of the electronic apparatus ED01. The battery ED89 may include a non-rechargeable primary battery, a rechargeable secondary battery, and/or a fuel cell.

The communication module ED90 may support establishment of a direct (wired) communication channel and/or a wireless communication channel between the electronic apparatus ED01 and other electronic apparatuses (the electronic apparatus ED02, the electronic apparatus ED04, the server ED08, etc.), and communication through the established communication channel. The communication module ED90 operates independently of the processor ED20 (an application processor, etc.) and may include one or more communication processors supporting direct communication and/or wireless communication. The communication module ED90 may include a wireless communication module ED92 (a cellular communication module, a short-range wireless communication module, a global navigation satellite system (GNSS), or the like) and/or a wired communication module ED94 (a local area network (LAN) communication module, a power line communication module, or the like). A corresponding communication module from among these communication modules may communicate with other electronic apparatuses through the first network ED98 (a local area network such as Bluetooth, WiFi Direct, or infrared data association (IrDA)) or the second network ED99 (a telecommunication network such as a cellular network, the Internet, or computer networks (LAN, WAN, etc.)). These various types of communication modules may be integrated into a single component (a single chip or the like) or may be implemented as a plurality of separate components (multiple chips).

The wireless communication module ED92 may identify and authenticate the electronic apparatus ED01 within a communication network such as the first network ED98 and/or the second network ED99 using subscriber information (an international mobile subscriber identifier (IMSI), etc.) stored in the subscriber identity module ED96.

The antenna module ED97 may transmit and/or receive signals and/or power to and/or from the outside (other electronic apparatuses, etc.). An antenna may include a radiator made of a conductive pattern formed on a substrate (a PCB, etc.). The antenna module ED97 may include one or more such antennas. When a plurality of antennas are included in the antenna module ED97, the communication module ED90 may select an antenna suitable for a communication method used in a communication network, such as the first network ED98 and/or the second network ED99, among the plurality of antennas. Signals and/or power may be transmitted or received between the communication module ED90 and other electronic apparatuses through the selected antenna. Other components (an RFIC, etc.) besides the antenna may be included as part of the antenna module ED97.

Some of the components may be connected to each other and exchange signals (commands, data, etc.) through a communication method between peripheral devices (a bus, general purpose input and output (GPIO), a serial peripheral interface (SPI), a mobile industry processor interface (MIPI), or the like).

Commands or data may be transmitted or received between the electronic apparatus ED01 and an external apparatus such as the electronic apparatus ED04 through the server ED08 connected to the second network ED99. The other electronic apparatuses ED02 and ED04 may be the same as or different from the electronic apparatus ED01. All or some of the operations of the electronic apparatus ED01 may be executed by one or more of the other electronic apparatuses ED02, ED04, and ED08. For example, when the electronic apparatus ED01 needs to perform certain functions or services, the electronic apparatus ED01 may request one or more other electronic apparatuses to perform some or all of the functions or services instead of directly executing the functions or services. One or more other electronic apparatuses that have received the request may execute an additional function or service related to the request, and may transfer results of the execution to the electronic apparatus ED01. To this end, cloud computing, distributed computing, and/or client-server computing techniques may be used.

Figure 15:
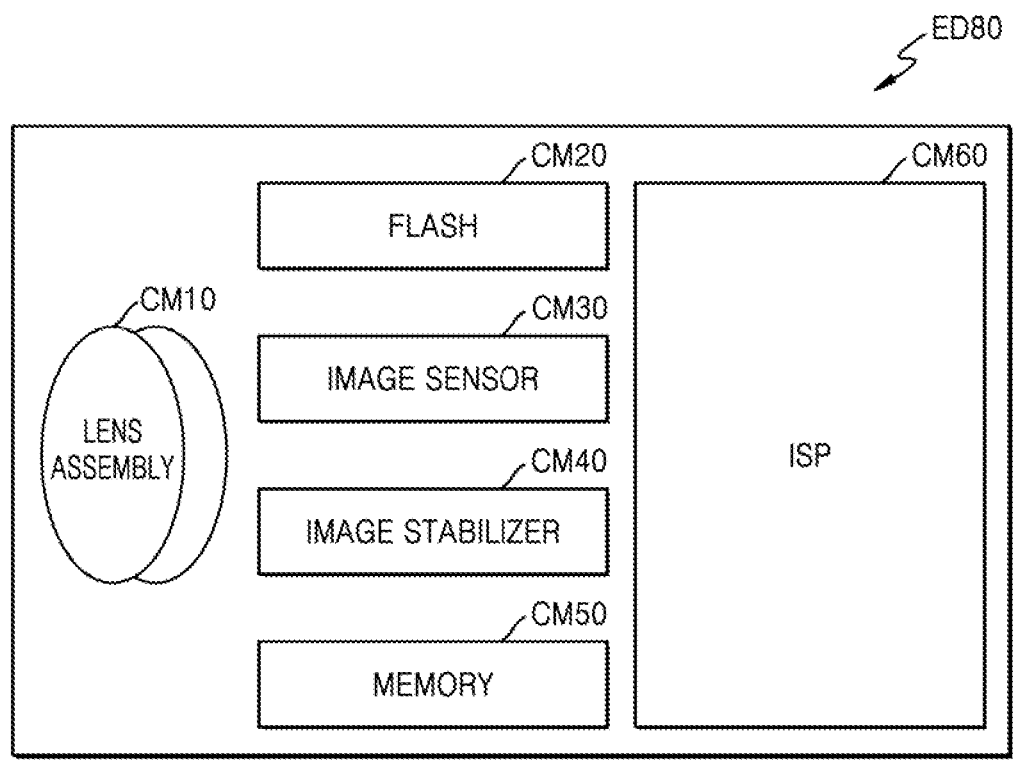
FIG. 15 is a block diagram illustrating a camera module included in the electronic apparatus of FIG. 14.

FIG. 15 is a block diagram schematically illustrating the camera module ED80 included in the electronic apparatus ED01 shown in FIG. 14. The camera module ED80 may include the image acquisition apparatus 1000 described above, or may have a structure modified therefrom. Referring to FIG. 15, the camera module ED80 may include a lens assembly CM10, a flash CM20, an image sensor CM30, an image stabilizer CM40, a memory CM50 (a buffer memory, etc.), and/or an ISP CM60.

The image sensor CM30 may include the first image sensor 100 and the second image sensor 200 provided in the image acquisition apparatus 1000 described above. The first image sensor 100 and the second image sensor 200 may obtain an image corresponding to an object by converting light emitted or reflected from the object and transmitted through the lens assembly CM10 into an electrical signal. The first image sensor 100 may obtain an RGB image, and the second image sensor 200 may obtain a hyperspectral image in an ultraviolet-to-infrared wavelength range.

In addition to the first image sensor 100 and the second image sensor 200 described above, the image sensor CM30 may further include one or more sensors selected from image sensors having different properties, such as another RGB image sensor, a black and white (BW) sensor, an infrared sensor, or an ultraviolet sensor. Each of the sensors included in the image sensor CM30 may be implemented as a CCD sensor and/or a CMOS sensor.

The lens assembly CM10 may collect light coming from an object to be imaged. The camera module ED80 may include a plurality of lens assemblies CM10, and in this case, the camera module ED80 may be a dual camera, a 360-degree camera, or a spherical camera. Some of the plurality of lens assemblies CM10 may have the same lens properties (field of view, focal length, autofocus, F Number, optical zoom, etc.) or different lens properties. Each of the lens assemblies CM10 may include a wide-angle lens or a telephoto lens.

The lens assembly CM10 may be configured and/or focused such that two image sensors included in the image sensor CM30 may form optical images of an object at the same position.

The flash CM20 may emit light used to enhance light emitted or reflected from an object. The flash CM20 may include one or more light emitting diodes (a red-green-blue (RGB) LED, a white LED, an infrared LED, an ultraviolet LED, etc.), and/or a xenon lamp.

The image stabilizer CM40 may move one or more lenses included in the lens assembly CM10 or the image sensor CM30 in a specific direction in response to a movement of the camera module ED80 or the electronic apparatus ED01 including the camera module ED80, or may control operating characteristics of the image sensor CM30 (adjustment of read-out timing, etc.) to compensate for negative effects caused by movement. The image stabilizer CM40 may detect a movement of the camera module ED80 or the electronic apparatus ED01 by using a gyro sensor (not shown) or an acceleration sensor (not shown) arranged inside or outside the camera module ED80. The image stabilizer CM40 may be an optical image stabilizer.

In the memory CM50, some or all of data obtained through the image acquisition apparatus 1000 may be stored for the next image processing operation. For example, when a plurality of images are obtained at a high speed, the obtained original data (Bayer-patterned data, high-resolution data, or the like) may be stored in the memory CM50 and only a low-resolution image may be displayed. Then, the original data of a selected image (user selection, etc.) may be transferred to the ISP CM60. The memory CM50 may be integrated into the memory ED30 of the electronic apparatus ED01 or may be configured as a separate memory that may be independently operated.

The ISP CM60 may perform one or more image processes on an image obtained through the image sensor CM30 or image data stored in the memory CM50. As described with reference to FIGS. 1 to 13, a first image (e.g., an RGB image) and a second image (e.g., an MSI image) obtained using two image sensors included in the image sensor CM30 are processed to form a white-balanced third image. To this end, components of the processor 500 may be included in the ISP CM60.

In addition, the one or more image processes may include depth map generation, three-dimensional modeling, panorama generation, feature point extraction, image synthesis, and/or image compensation (noise reduction, resolution adjustment, brightness adjustment, blurring, sharpening, softening, etc.). The ISP CM60 may control (exposure time control, read-out timing control, etc.) components (the image sensor CM30, etc.) included in the camera module CM80. An image processed by the ISP CM60 may be stored again in the memory CM50 for additional processing or may be provided to external components (the memory ED30, the display device ED60, the electronic apparatus ED02, the electronic apparatus ED04, the server ED08, etc.) of the camera module ED80. The ISP CM60 may be integrated into the processor ED20 or may be configured as a separate processor that operates independently of the processor ED20. When the ISP CM60 is provided separately from the processor ED20, an image processed by the ISP CM60 may be displayed on the display device ED60 after being further processed by the processor ED20.

The electronic apparatus ED01 may include a plurality of camera modules ED80 having different attributes or functions. In this case, one of the plurality of camera modules ED80 may be a wide-angle camera, and another of the plurality of camera modules ED80 may be a telephoto camera. Similarly, one of the plurality of camera modules ED80 may be a front camera, and another of the plurality of camera modules ED80 may be a rear camera.

FIGS. 16 to 25 are views illustrating various examples of an electronic apparatus to which the image acquisition apparatus 1000 is applied according to embodiments.

Figure 16:
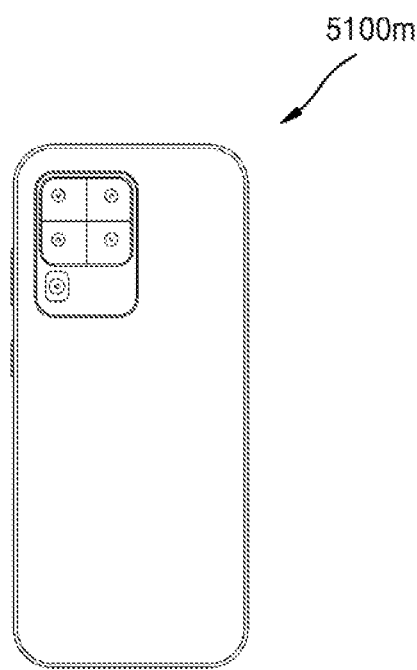
FIGS. 16 to 25 are views illustrating various examples of an electronic apparatus including an image acquisition apparatus according to embodiments.
Figure 17:
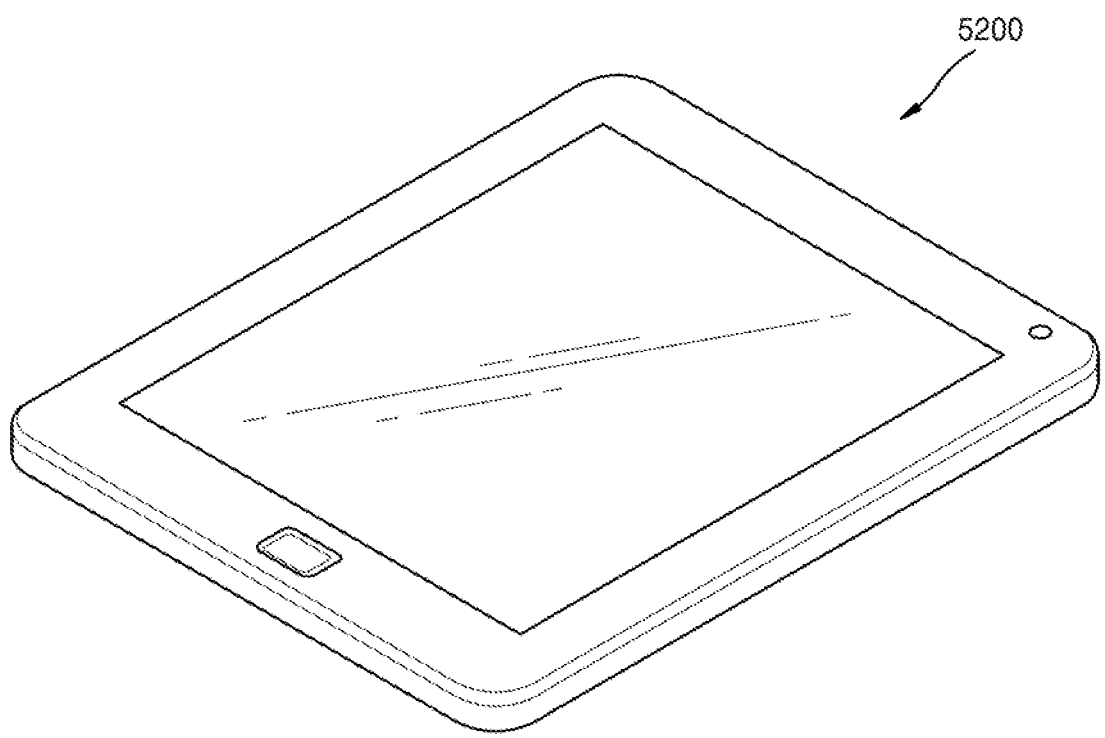
Figure 18:
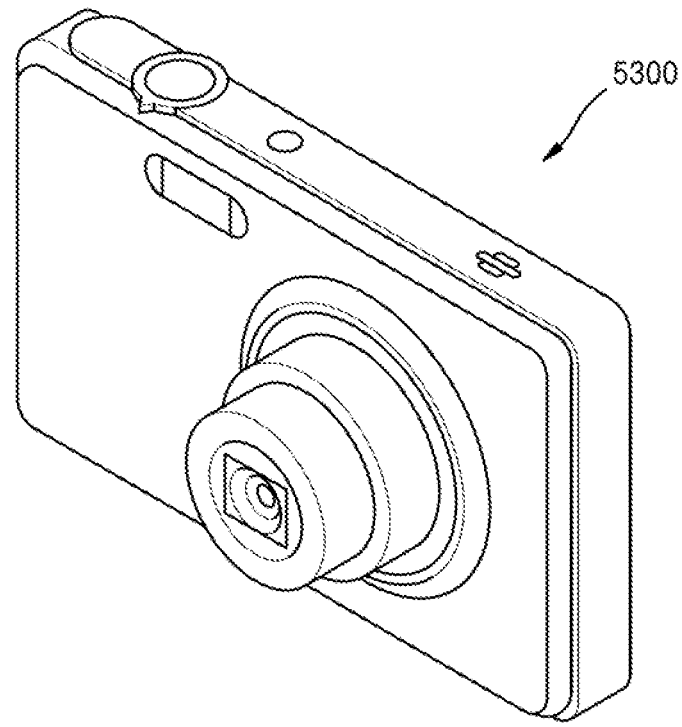
Figure 19:
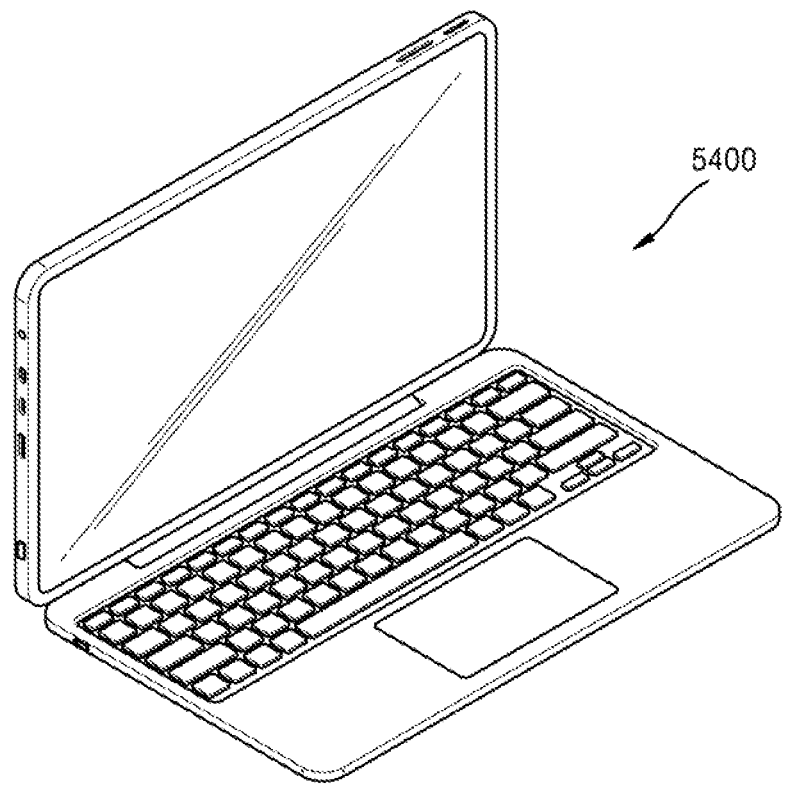
Figure 20:
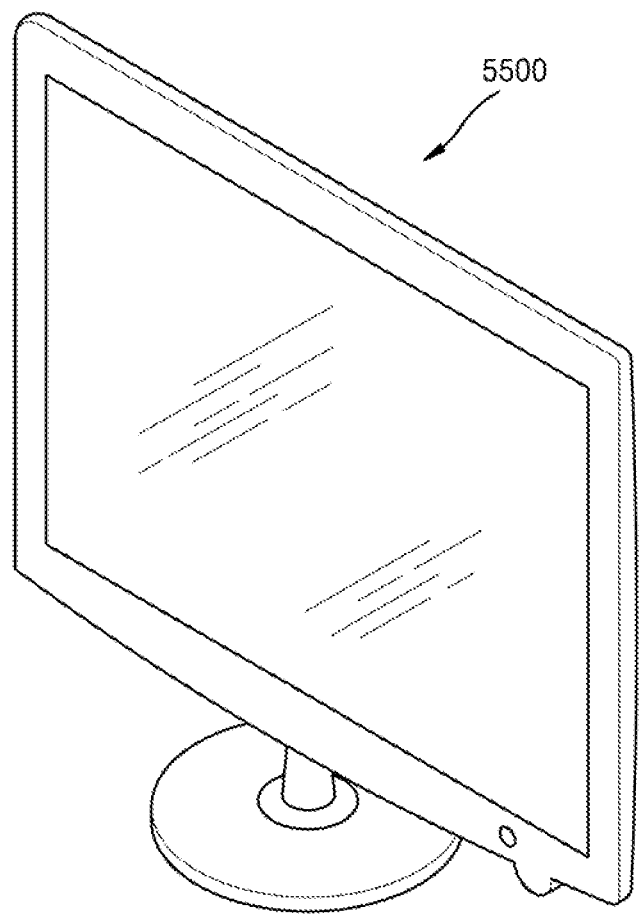

According to embodiments, the image acquisition apparatus 1000 may be applied to a mobile phone or smartphone 5100m shown in FIG. 16, a tablet or smart tablet 5200 shown in FIG. 17, a digital camera or camcorder 5300 shown in FIG. 18, a laptop computer 5400 shown in FIG. 19, or a television or smart television 5500 shown in FIG. 20. For example, the smartphone 5100m or the smart tablet 5200 may include a plurality of high-resolution cameras each having a high-resolution image sensor mounted thereon. The high-resolution cameras may be used to extract depth information of objects in an image, adjust out of focus of an image, or automatically identify objects in an image.

Figure 21:
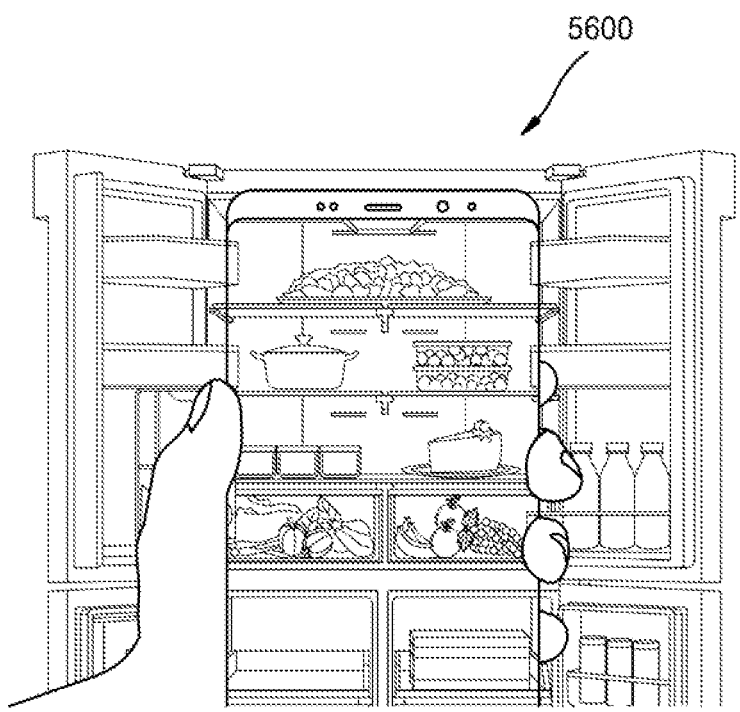
Figure 22:
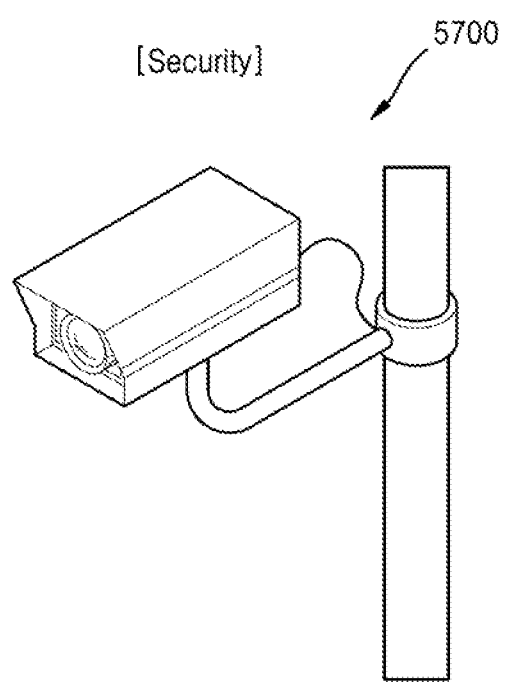
Figure 23:
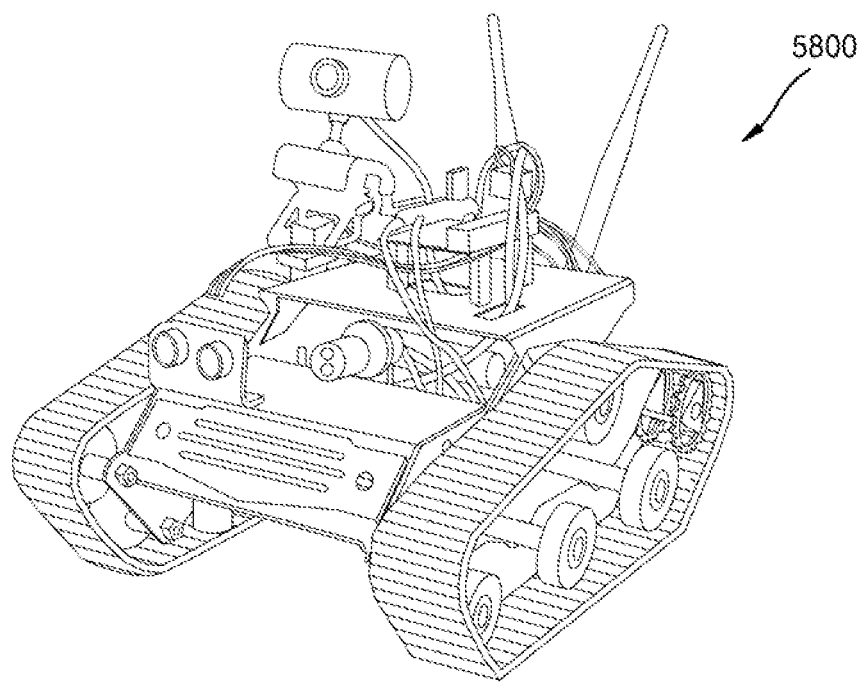
Figure 24:
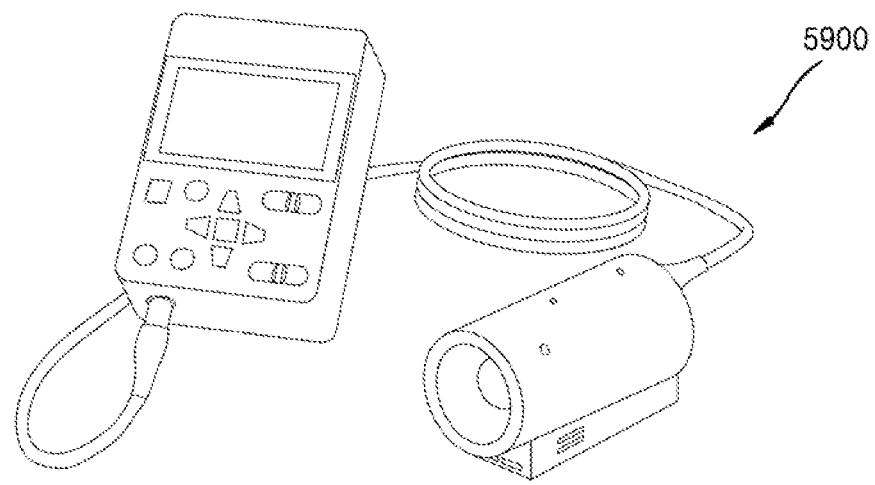

In addition, the image acquisition apparatus 1000 may be applied to a smart refrigerator 5600 shown in FIG. 21, a security camera 5700 shown in FIG. 22, a robot 5800 shown in FIG. 23, a medical camera 5900 shown in FIG. 24, and the like. For example, the smart refrigerator 5600 may automatically recognize food contained in the smart refrigerator 5600 by using the image acquisition apparatus 1000, and may inform a user of whether a specific food is contained in the smart refrigerator 5600, the type of food put into or out of the smart refrigerator 5600, and the like through a smartphone. The security camera 5700 may provide an ultra-high-resolution image and may recognize an object or a person in the ultra-high-resolution image even in a dark environment owing to high sensitivity of the security camera 5700. The robot 5800 may be sent to a disaster or industrial site that cannot be directly accessed by humans and may provide high-resolution images. The medical camera 5900 may provide a high-resolution image for diagnosis or surgery, and may have a dynamically adjustable field of view.

Figure 25:
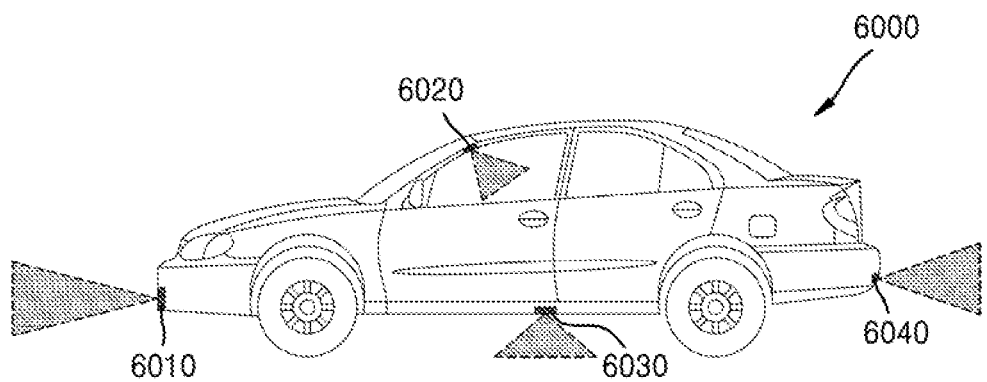

In addition, the image acquisition apparatus 1000 may be applied to a vehicle 6000 as shown in FIG. 25. The vehicle 6000 may include a plurality of vehicle cameras 6010, 6020, 6030, and 6040 arranged at various positions. Each of the vehicle cameras 6010, 6020, 6030, and 6040 may include an image acquisition apparatus according to an embodiment. The vehicle 6000 may use the vehicle cameras 6010, 6020, 6030, and 6040 to provide a driver with various information about the interior or surroundings of the vehicle 6000, and may provide information necessary for autonomous driving by automatically recognizing objects or people in images.

As described above, according to the one or more of the above embodiments, the image acquisition apparatus may perform accurate white balancing even under one or more illumination lights without limitations by using two different types of image sensors.

The image acquisition apparatus may be employed in various electronic apparatuses.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image acquisition apparatus comprising:
   a first image sensor configured to acquire a first image based on a first wavelength band;
   a second image sensor having more channels than the first image sensor and configured to acquire a second image based on a second wavelength band comprising the first wavelength band; and
   a processor configured to:
      register the first image and the second image, which are respectively output from the first image sensor and the second image sensor;
      obtain a registration image based on the first image and the second image; and
      perform color conversion on the registration image by using an illumination value estimated from the second image,
   wherein the processor is further configured to:
   divide the first image into one or more first regions and divide the second image into one or more second regions respectively corresponding to the one or more first regions;
   estimate a respective illumination value for each of the one or more second regions;
   perform the color conversion on each of the one or more first regions by using the estimated illumination values, and
   when a difference between illumination values respectively estimated for adjacent second regions of the one or more second regions is greater than or equal to a first threshold value, adjust any one of the illumination values of the adjacent second regions to adjust the difference to be less than the first threshold value.

2. The image acquisition apparatus of claim 1,
   wherein the processor is further configured to, after performing the color conversion, perform post-processing on a boundary portion between the adjacent second regions.

3. The image acquisition apparatus of claim 1,
   wherein the processor is further configured to calculate a parameter for registering the first image and the second image based on at least one of a resolution, a field of view, and a focal length of each of the first image sensor and the second image sensor.

4. The image acquisition apparatus of claim 1,
   wherein the processor is further configured to estimate the illumination value by using spectral information obtained from a plurality of channels output from the second image sensor.

5. The image acquisition apparatus of claim 1,
   wherein the processor is further configured to estimate the illumination value by using a neural network trained on a plurality of second images associated with predetermined illumination values.

6. The image acquisition apparatus of claim 1,
   wherein the processor is further configured to register the first image and the second image by respectively extracting first features from the first image and second features from the second image and matching the first extracted features with the second extracted features.

7. The image acquisition apparatus of claim 1,
   wherein the processor is further configured to register the first image and the second image in units of pixel groups, pixels, or sub-pixels of the first image and the second image.

8. The image acquisition apparatus of claim 1,
   wherein the first image sensor comprises a first pixel array comprising:
      a first sensor layer in which a plurality of first sensing elements are arrayed; and
      a color filter on the first sensor layer and comprising red, green, and blue filters which are alternately arranged,
   wherein the second image sensor comprises a second pixel array comprising:
      a second sensor layer in which a plurality of second sensing elements are arrayed; and
      a spectral filter on the second sensor layer and in which a filter group is repeatedly arranged, the filter group comprising a plurality of unit filters each having a different transmission wavelength band from each other unit filter in the filter group.

9. The image acquisition apparatus of claim 8,
   wherein a combined transmission wavelength band of the plurality of unit filters of the filter group includes a visible light wavelength band and is wider than the visible light wavelength band, and
   wherein the plurality of unit filters comprises 16 unit filters arranged in a 4×4 array.

10. The image acquisition apparatus of claim 8,
    wherein the first pixel array and the second pixel array are horizontally apart from each other on a circuit board.

11. The image acquisition apparatus of claim 10,
    wherein first circuit elements configured to process a signal from the first sensor layer, and second circuit elements configured to process a signal from the second sensor layer are provided on the circuit board.

12. The image acquisition apparatus of claim 11, further comprising a timing controller configured to synchronize operations of the first circuit elements with operations of the second circuit elements.

13. The image acquisition apparatus of claim 10, further comprising:
    a first memory storing data about the first image; and
    a second memory storing data about the second image.

14. The image acquisition apparatus of claim 13,
    wherein the first memory and the second memory are provided inside the circuit board.

15. The image acquisition apparatus of claim 1, further comprising:
    a first imaging optical system configured to form a first optical image of an object on the first image sensor, the first imaging optical system comprising at least one first lens; and a second imaging optical system configured to form a second optical image of the object on the second image sensor, the second imaging optical system comprising at least one second lens.

16. The image acquisition apparatus of claim 15, wherein the first imaging optical system and the second imaging optical system have an identical focal length and an identical field of view.

17. An electronic apparatus comprising the image acquisition apparatus of claim 1.

18. A method of controlling an image acquisition apparatus including a plurality of image sensors, the method comprising:
acquiring a first image and a second image from a first image sensor having a first wavelength band and a second image sensor having more channels than the first image sensor and having a second wavelength band comprising the first wavelength band, respectively;
registering the acquired first and second images to obtain a registration image; and
performing color conversion on the registration image by using an illumination value estimated from the second image,
wherein the performing color conversion further comprises:
dividing the first image into one or more first regions and dividing the second image into one or more second regions respectively corresponding to the one or more first regions;
estimating a respective illumination value for each of the one or more second regions;
performing the color conversion on each of the one or more first regions by using the estimated illumination values, and
when a difference between illumination values respectively estimated for adjacent second regions of the one or more second regions is greater than or equal to a first threshold value, adjusting any one of the illumination values of the adjacent second regions to adjust the difference to be less than the first threshold value.

19. An image acquisition apparatus comprising:
a first image sensor comprising a first filter and configured to acquire a first image based on a first wavelength band;
a second image sensor comprising a second filter, having more channels than the first image sensor, and configured to acquire a second image based on a second wavelength band comprising the first wavelength band; and
a processor configured to:
receive the first image of an object from the first image sensor and the second image of the object from the second image sensor; and
based on the received first image and the received second image, generate a white balanced first image of the object by eliminating an influence of illumination reflected by the object,
wherein the processor is further configured to:
divide the first image into one or more first regions and divide the second image into one or more second regions respectively corresponding to the one or more first regions;
estimate a respective illumination value for each of the one or more second regions;
perform the color conversion on each of the one or more first regions by using the estimated illumination values, and
when a difference between illumination values respectively estimated for adjacent second regions of the one or more second regions is greater than or equal to a first threshold value, adjust any one of the illumination values of the adjacent second regions to adjust the difference to be less than the first threshold value.

20. The image acquisition apparatus of claim 19, wherein the first image sensor comprises a plurality of first pixels,
wherein the first filter comprises a plurality of first filter groups repeatedly arranged, each first filter group comprising a plurality of first unit filters each corresponding to a respective first pixel,
wherein the second image sensor comprises a plurality of second pixels,
wherein the second filter comprises a plurality of second filter groups repeatedly arranged, each second filter group comprising a plurality of second unit filters each corresponding to a respective second pixel,
wherein each first filter group of the first filter corresponds to a respective second filter group of the second filter, and
wherein a wavelength band of each first unit filter is larger than a wavelength band of each second unit filter.

21. The image acquisition apparatus of claim 19, wherein the processor is further configured to:
generate a conversion matrix based on the second image for eliminating the influence of illumination reflected by the object; and
generate the white balanced first image based on the conversion matrix and the first image.

* * * * *